(12) United States Patent
Kurosawa

(10) Patent No.: US 12,291,851 B2
(45) Date of Patent: May 6, 2025

(54) INFORMATION PROCESSING APPARATUS, INFORMATION PROCESSING METHOD, RECORDING MEDIUM, AND WORK MACHINE

(71) Applicant: SUMITOMO CONSTRUCTION MACHINERY CO., LTD., Tokyo (JP)

(72) Inventor: Ryota Kurosawa, Chiba (JP)

(73) Assignee: SUMITOMO CONSTRUCTION MACHINERY CO., LTD., Tokyo (JP)

( * ) Notice: Subject to any disclaimer, the term of this patent is extended or adjusted under 35 U.S.C. 154(b) by 438 days.

(21) Appl. No.: 17/449,284

(22) Filed: Sep. 29, 2021

(65) Prior Publication Data

US 2022/0018097 A1   Jan. 20, 2022

Related U.S. Application Data

(63) Continuation of application No. PCT/JP2020/012192, filed on Mar. 19, 2020.

(30) Foreign Application Priority Data

Mar. 30, 2019   (JP) ................................. 2019-069486

(51) Int. Cl.
  *E02F 9/26*   (2006.01)
  *E02F 9/20*   (2006.01)
  *G05D 1/00*   (2024.01)

(52) U.S. Cl.
  CPC ............ *E02F 9/262* (2013.01); *E02F 9/2004* (2013.01); *E02F 9/264* (2013.01); *G05D 1/0005* (2013.01); *G05D 1/0219* (2013.01)

(58) Field of Classification Search
  CPC ......... E02F 9/262; E02F 9/2004; E02F 9/264; E02F 9/261; E02F 9/26; E02F 9/205;
  (Continued)

(56) References Cited

U.S. PATENT DOCUMENTS 7,395,213 B2 *  7/2008  Kinugawa .............. G06Q 30/04
                                                       705/307
7,440,846 B2    10/2008  Yie et al.
(Continued)

FOREIGN PATENT DOCUMENTS

JP   2002-138515   5/2002
JP   2003-140743   5/2003
(Continued)

OTHER PUBLICATIONS

International Search Report for PCT/JP2020/012192 mailed on Jun. 16, 2020.

*Primary Examiner* — Russell Frejd
*Assistant Examiner* — Brandon Z Willis
(74) *Attorney, Agent, or Firm* — IPUSA, PLLC

(57) ABSTRACT

An information processing apparatus includes an information acquiring unit configured to acquire, from a work machine including a work attachment, information relating to the work machine of when the work machine is in operation, the information being information for which a user who is predetermined and who is related to the work machine has indicated an intention to provide; and an incentive granting unit configured to perform a process of granting an incentive to the user, in response to determining that the information acquired by the information acquiring unit satisfies an evaluation condition that is predetermined.

17 Claims, 9 Drawing Sheets

(58) Field of Classification Search
CPC ..... E02F 9/267; G05D 1/0005; G05D 1/0055;
G05D 1/0219; G05D 2201/0201; G05D
2201/0202; G07C 3/02; G07C 3/08;
G07C 5/00; G07C 5/004; G07C 5/006;
G07C 5/008; G07C 5/02; G07C 5/08;
G07C 5/0816; G07C 5/0825; G07C
5/0841; G07C 5/0808; G07C 11/00;
B66C 13/16; B66C 13/18; B66F 9/20;
B66F 9/24; G06Q 10/0639; G06Q
10/06398; G06Q 10/06; G06Q 50/08;
G06Q 30/06; G06Q 30/0645
See application file for complete search history.

(56) References Cited

U.S. PATENT DOCUMENTS

| | | | | |
|---|---|---|---|---|
| 8,217,777 | B2* | 7/2012 | Sekiyama | G08G 1/127 340/459 |
| 2005/0021191 | A1* | 1/2005 | Taniguchi | B60W 30/18127 701/1 |
| 2006/0047630 | A1* | 3/2006 | Furuno | G06Q 10/06 |
| 2010/0100338 | A1* | 4/2010 | Vik | G01M 5/0033 702/42 |
| 2015/0206166 | A1* | 7/2015 | Fletcher | G06Q 10/06 705/14.27 |
| 2017/0236137 | A1* | 8/2017 | Yamato | G06Q 30/0207 705/14.1 |
| 2018/0285998 | A1* | 10/2018 | Yamaguchi | G06Q 50/26 |
| 2018/0341901 | A1 | 11/2018 | Shike | |
| 2020/0219337 | A1* | 7/2020 | Kwak | G07C 5/008 |

FOREIGN PATENT DOCUMENTS

| | | |
|---|---|---|
| JP | 2005-243010 | 9/2005 |
| JP | 2007-293626 | 11/2007 |
| JP | 2009-235833 | 10/2009 |
| JP | 2017-045215 | 3/2017 |
| JP | 2018-206203 | 12/2018 |

* cited by examiner

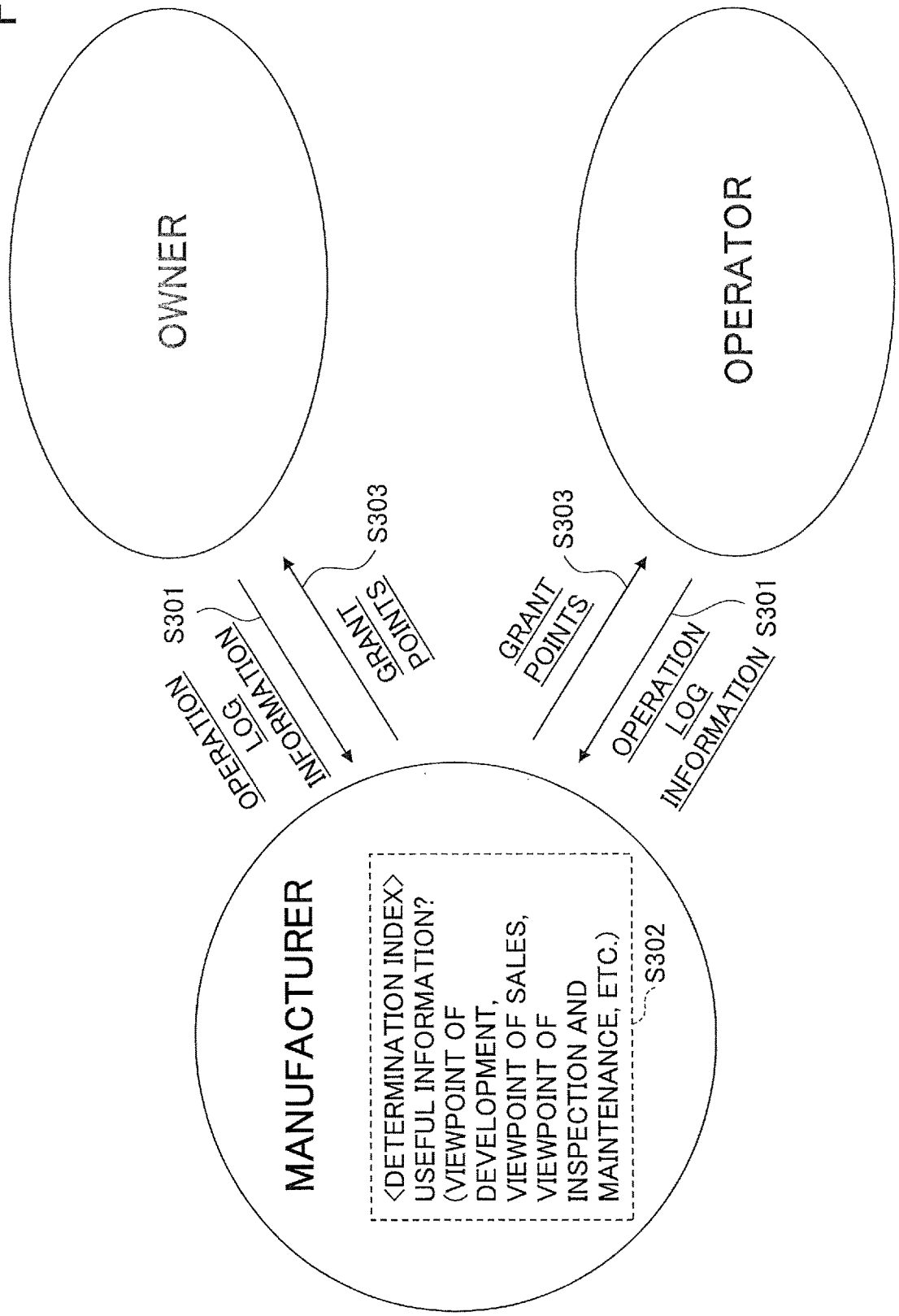

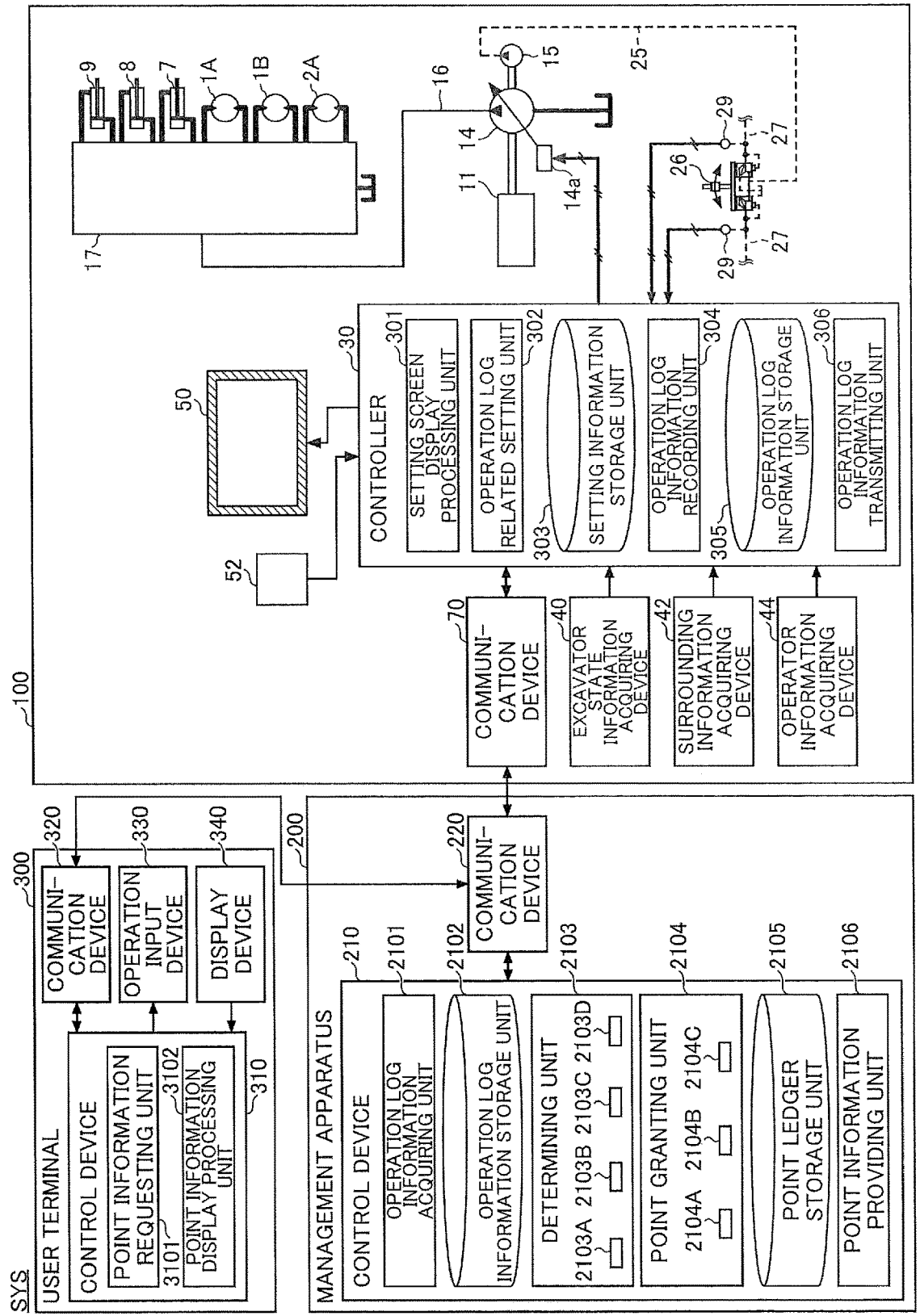

INFORMATION PROCESSING APPARATUS, INFORMATION PROCESSING METHOD, RECORDING MEDIUM, AND WORK MACHINE

CROSS-REFERENCE TO RELATED APPLICATIONS

The present application is a continuation application of International Application No. PCT/JP2020/012192 filed on Mar. 19, 2020, which claims priority to Japanese Patent Application No. 2019-069486, filed on Mar. 30, 2019. The contents of these applications are incorporated herein by reference in their entirety.

BACKGROUND

1. Technical Field

The present disclosure relates to information processing apparatus, and the like.

2. Description of the Related Art

For example, a technique is known in which various kinds of information relating to a work machine (for example, an excavator and the like) are collected and an operator of the work machine is evaluated from the viewpoint of operability, energy saving, and the like.

Further, a technique for collecting and analyzing various kinds of information relating to a work machine is known.

SUMMARY

According to an embodiment of the present invention, there is provided an information processing apparatus including an information acquiring unit configured to acquire, from a work machine including a work attachment, information relating to the work machine of when the work machine is in operation, the information being information for which a user who is predetermined and who is related to the work machine has indicated an intention to provide; and an incentive granting unit configured to perform a process of granting an incentive to the user, in response to determining that the information acquired by the information acquiring unit satisfies an evaluation condition that is predetermined.

Further, in another embodiment of the present invention, there is provided an information processing method executed by an information processing apparatus, the information processing method including acquiring, from a work machine including a work attachment, information relating to the work machine of when the work machine is in operation, the information being information for which a user who is predetermined and who is related to the work machine has indicated an intention to provide; and performing a process of granting an incentive to the user, in response to determining that the acquired information satisfies an evaluation condition that is predetermined.

Further, in another embodiment of the present invention, there is provided a non-transitory computer-readable recording medium storing a program that causes a computer to execute a process performed in an information processing apparatus, the process including acquiring, from a work machine including a work attachment, information relating to the work machine of when the work machine is in operation, the information being information for which a user who is predetermined and who is related to the work machine has indicated an intention to provide; and performing a process of granting an incentive to the user, in response to determining that the acquired information satisfies an evaluation condition that is predetermined.

Further, in another embodiment of the present invention, there is provided a work machine including a work attachment; an information acquiring unit configured to acquire information relating to the work machine of when the work machine is in operation, the information being information for which a user who is predetermined and who is related to the work machine has indicated an intention to provide; an incentive granting unit configured to perform a process of granting an incentive to the user, in response to determining that the information acquired by the information acquiring unit satisfies an evaluation condition that is predetermined, and an information transmitting unit configured to transmit information relating to the incentive granted to the user by the incentive granting unit, to at least one of another work machine or a predetermined external device.

BRIEF DESCRIPTION OF THE DRAWINGS

FIG. 4C is a conceptual diagram illustrating a third example of the relationship between information collection and point granting in an information collection system;

FIG. 5 is a block diagram illustrating an example of a configuration of an information collection system.

DETAILED DESCRIPTION

In the conventional technology, in order to collect various kinds of information relating to the work machine, the approval of the owner, the operator, and the like, of the work machine may be required. Therefore, there is a possibility that it is not possible to efficiently collect various kinds of information relating to the work machine.

Therefore, it is desirable to provide a technique that enables efficient collection of various kinds of information relating to the work machine.

Hereinafter, embodiments will be described with reference to the drawings.

[Overview of Information Collection System]

First, an outline of an information collection system SYS according to the present embodiment will be described with reference to FIGS. 1 to 3.

Figure 1:
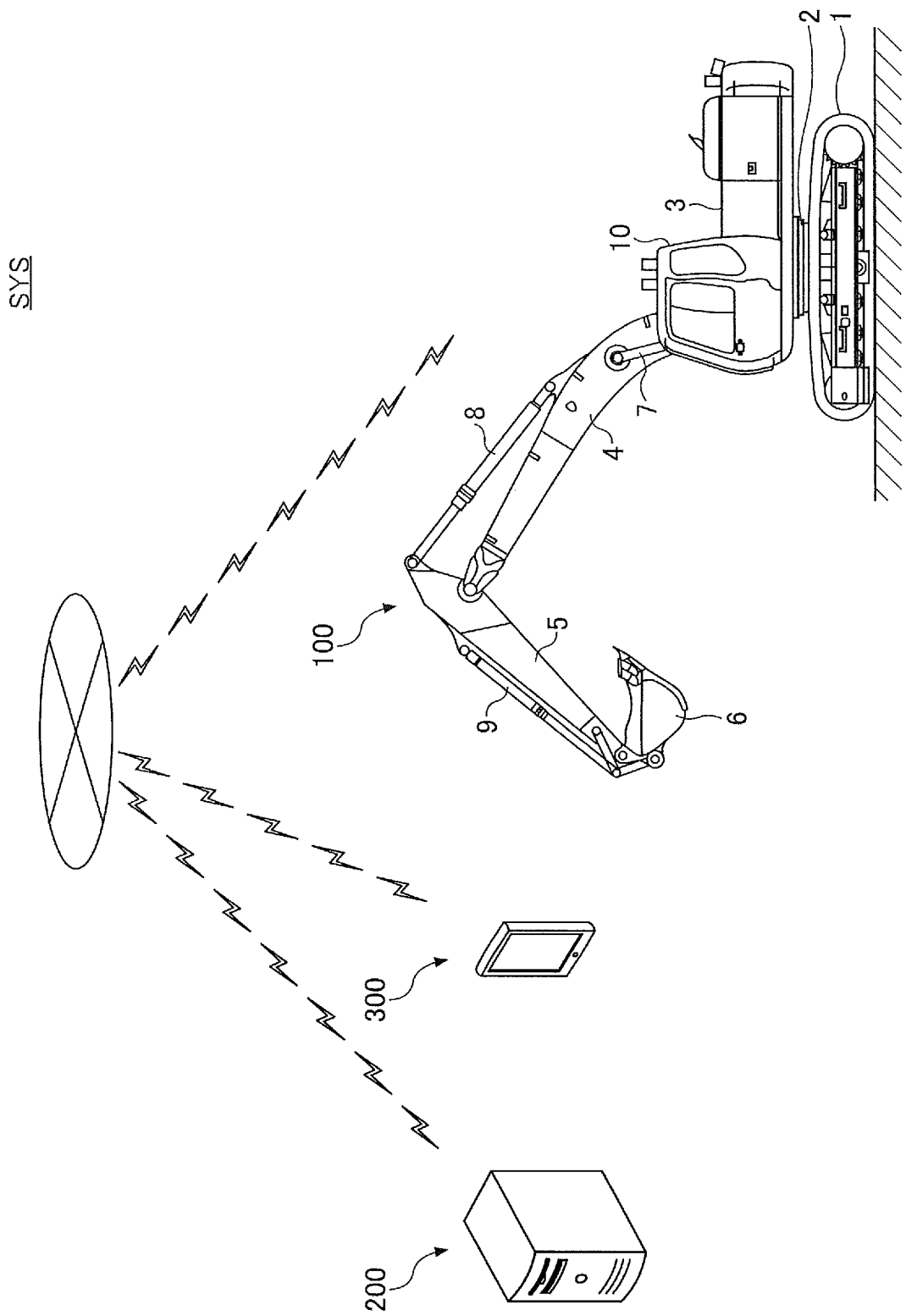
FIG. 1 is a diagram illustrating an overview of an information collection system.

FIG. 1 is a diagram illustrating an outline of the information collection system SYS according to the present embodiment.

The information collection system SYS includes an excavator 100, a management apparatus 200, and a user terminal 300.

The information collection system SYS collects various kinds of information relating to the excavator 100 from the excavator 100 (an example of a work machine). The information collected from the excavator 100 is, for example, various kinds of information at the time when the excavator 100 is running (i.e., in operation), that is, from the activation of the excavator 100 (i.e., when the key switch is turned on) to the stop of the excavator 100 (i.e., when the key switch is turned OFF). The information collected from the excavator 100 may be, for example, various kinds of information at the time when the excavator 100 is not running (i.e., not operating), that is, from when the excavator 100 is stopped, to when the excavator 100 is activated next. In this case, the latter information includes, for example, information relating to the motion state of a function relating to security (e.g., a theft prevention function and the like) of the excavator 100 and the like, when such a function is mounted on the excavator 100. Hereinafter, in the present embodiment, the information collected from the excavator 100 is mainly explained on the assumption that the information represents contents at the time when the excavator 100 is running.

Further, the information collection system SYS grants an incentive to a user with respect to the excavator 100 (hereinafter, "excavator-related user") when the information collected (acquired) from the excavator 100 satisfies a predetermined evaluation condition (hereinafter, simply "evaluation condition"). An excavator-related user includes, for example, the owner of the excavator 100, the operator of the excavator 100, and the like. Further, the incentive is, for example, a point granted in a form of being associated with the user identification information of the excavator-related user (for example, an ID (Identifier)) in a predetermined point program, or a coupon and the like distributed electronically to the user terminal 300 and the like of the excavator-related user. In this case, the point program may be a point program set to be exclusively used for the information collection system SYS or an existing (general-purpose) point program. Hereinafter, the explanation of the information collection system SYS proceeds on the assumption of granting points when the collected information satisfies an evaluation condition.

The excavator 100 included in the information collection system SYS may be an excavator or a plurality of excavators. The user terminal 300 included in the information collection system SYS may be a single terminal or a plurality of terminals.

Further, the information collection system SYS may include one or more other work machines in place of or in addition to the excavator 100. In this case, the information collection system SYS collects various kinds of information relating to other work machines in the management apparatus 200, similar to the case of the excavator 100. The information collection system SYS grants an incentive to a user of another work machine when the information collected from the other work machine satisfies an evaluation condition in the management apparatus 200.

Other work machines may include, for example, construction machines other than the excavator 100. Construction machines include, for example, bulldozers, wheel loaders and the like.

Other work machines may include, for example, cargo handling and transporting machines.

Figure 2A:
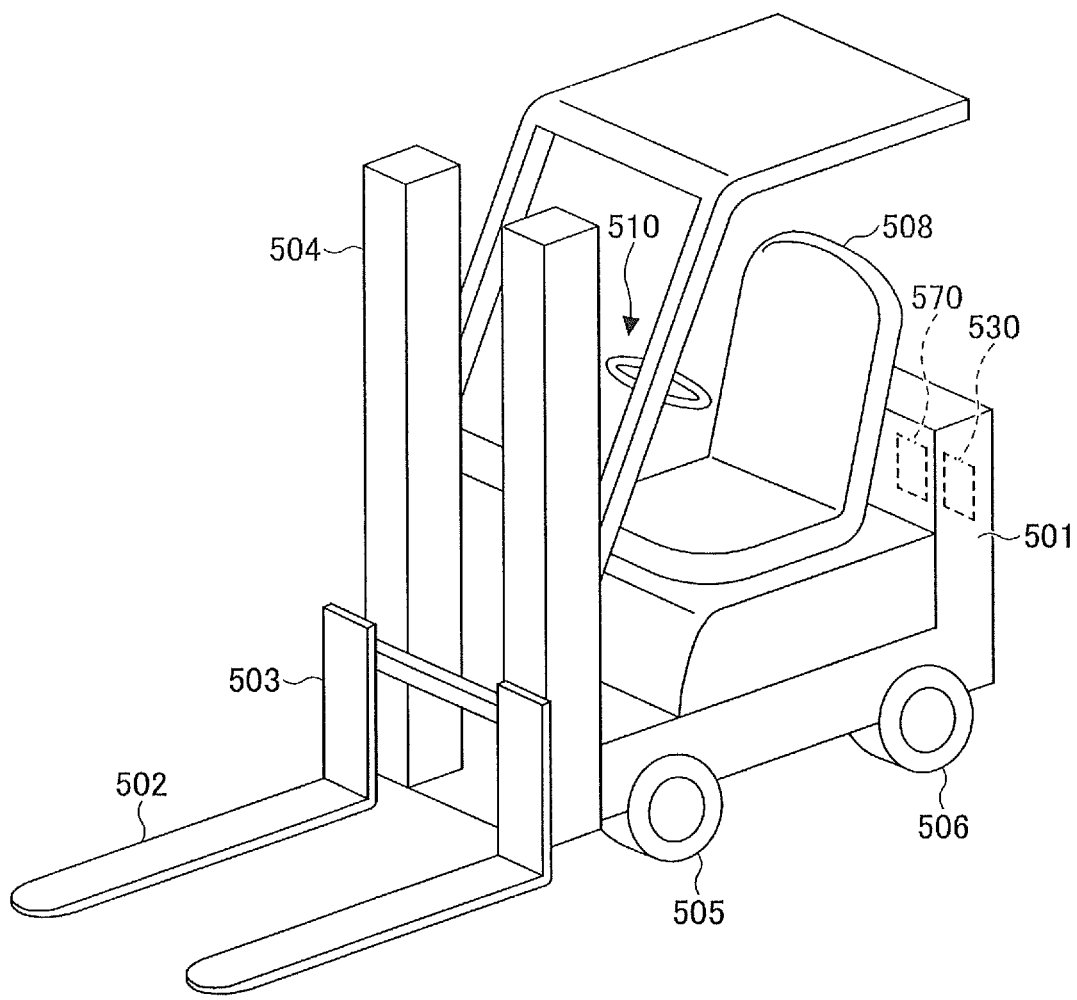
FIG. 2A is a diagram illustrating an example of a forklift.
Figure 2B:
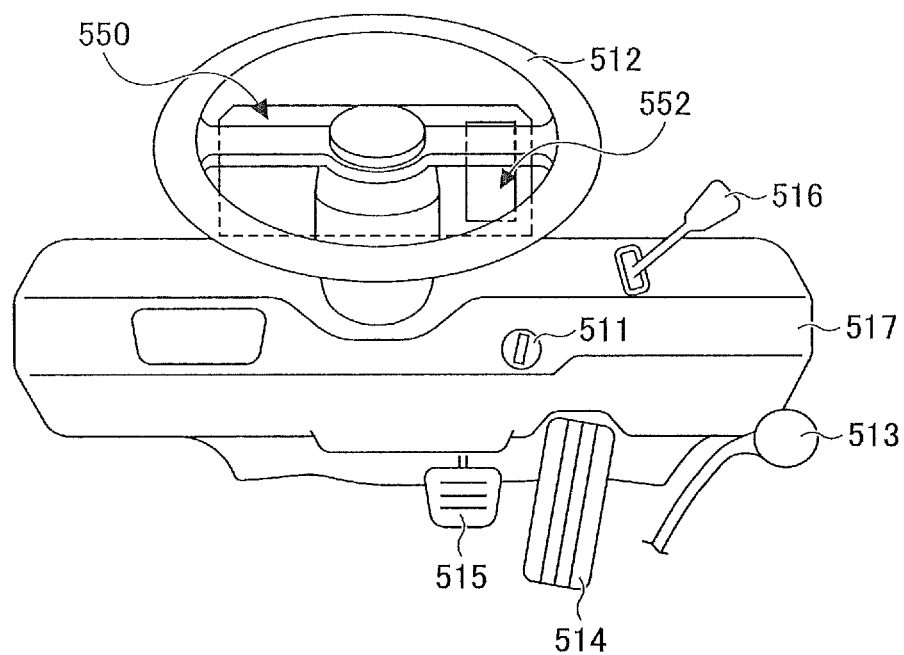
FIG. 2B is a diagram illustrating an example of a forklift.

For example, FIGS. 2 (2A, 2B) and 3 are diagrams illustrating specific examples of a cargo handling and transporting machine. Specifically, FIGS. 2A and 2B are diagrams illustrating an example of a forklift 500. FIG. 3 is a diagram illustrating an example of a crawler crane 600.

As illustrated in FIGS. 2 (2A, 2B) and 3, the information collection system SYS may include a cargo handling and transporting machine such as the forklift 500 or the crawler crane 600 and the like as another work machine.

Other work machines may include, for example, forestry machines. Forestry machines include, for example, forestry harvesters and the like.

Other work machines may include, for example, agricultural machines. Agricultural machines include, for example, combines and the like.

<Overview of Excavator>

As illustrated in FIG. 1, the excavator 100 according to the present embodiment includes a lower traveling body 1, an upper turning body 3 that is turnably mounted to the lower traveling body 1 through a turning mechanism 2, an attachment (an example of a work attachment) that is mainly configured by a boom 4, an arm 5, and a bucket 6, and a cabin 10 in which an operator is to be seated.

The lower traveling body 1 includes, for example, a pair of crawlers constituted by a left crawler and a right crawler, and each crawler is hydraulically driven by traveling hydraulic motors 1A and 1B (see FIG. 5), so as to be self-propelling.

The upper turning body 3 is hydraulically driven by a turning hydraulic motor 2A (see FIG. 5) to turn relative to the lower traveling body 1.

The boom 4 is pivotally mounted to the front center of the upper turning body 3 so as to be elevated, the arm 5 is pivotally mounted to the leading end of the boom 4 so as to turn upward and downward, and the bucket 6 that is an end attachment is pivotally mounted to the leading end of the arm 5 so as to turn upward and downward.

The bucket 6 is mounted to the leading end of the arm 5 in a suitably replaceable manner according to the work content of the excavator 100. Therefore, the bucket 6 may be replaced with a different type of bucket, such as a large bucket, slope bucket, dredging bucket, and the like. Further, the bucket 6 may be replaced by a different type of end attachment, such as an agitator, a breaker, and the like.

The boom 4, the arm 5, and the bucket 6 are hydraulically driven a boom cylinder 7, an arm cylinder 8, and a bucket cylinder 9, respectively, as hydraulic actuators.

The cabin 10 is mounted on the front left side of the upper turning body 3, and an operator seat on which an operator is to be seated and an operation device 26 and the like which will be described later are provided inside (in the interior of) the cabin 10.

The excavator 100 is communicatively connected to the management apparatus 200 through a communication device 70 (see FIG. 5).

The excavator 100 transmits (uploads) information (hereinafter, "operation log information") relating to the excavator 100 at the time when the excavator 100 is running, the to the management apparatus 200 through the communication device 70 upon approval by an operator or an owner and the like of the excavator 100. An operation for approval by an operator or an owner of the excavator 100 and the like may be performed via an input device 52 or via the management apparatus 200 from the user terminal 300 in advance. For example, the excavator-related user (the owner or the operator of the excavator 100 and the like) performs an approval operation on an operation screen (hereinafter, a "user registration screen") for registering himself/herself as a user in the information collection system SYS displayed on the display device 50. The excavator-related user may perform user registration with respect to the information collection system SYS through the user terminal 300 (e.g., a smartphone and the like). In this case, the excavator-related user accesses a predetermined web page or activates a predetermined application program through the user terminal 300, to display the user registration screen. The user registration or the upload of the operation log information may be approved from the user registration screen displayed on the user terminal 300.

For example, the excavator 100 transmits operation log information including information relating to the state of the excavator 100 at the time when the excavator 100 is running (hereinafter, the "excavator state information") to the management apparatus 200 through the communication device 70. The excavator state information is acquired by an excavator state information acquiring device 40 (see FIG. 5). The excavator state information may include, for example, information relating to the operation state of the excavator 100 (hereinafter, "excavator operation state information"). The excavator state information may include, for example, information relating to the motion state of the excavator 100 (hereinafter, the "excavator motion state information"). Further, the excavator state information may include information relating to the orientation state of the excavator 100 (hereinafter, the "excavator orientation state information"). The excavator state information may include information relating to the running state (operation state) of an engine 11 that is the power source of the excavator 100 (hereinafter, the "engine running state information").

For example, the excavator 100 transmits operation log information including information relating to the surrounding environment of the excavator 100 (hereinafter, the "surrounding information") to the management apparatus 200 through the communication device 70. The surrounding information is acquired, for example, by a surrounding information acquiring device 42 (see FIG. 5).

The surrounding information may include, for example, information on the weather (hereinafter, "weather information") or information on the outside air temperature (hereinafter, "outside air temperature information"). The surrounding information may also include information relating to an object including the terrain in a three-dimensional space around the excavator 100 (for example, information relating to an object around the excavator 100 or the position of the object) (hereinafter, "surrounding object information").

For example, the excavator 100 transmits operation log information including information relating to an operator of the excavator 100 (hereinafter, "operator information") to the management apparatus 200 through the communication device 70. The operator information is acquired, for example, by an operator information acquiring device 44 (see FIG. 5).

The operator information may include information identifying the operator operating the excavator 100 (for example, an operator ID and the like defined in advance for each operator) (hereinafter, "operator identification information"). The operator information may include biological information (e.g., brainwaves, heart rate, and the like) of the operator operating the excavator 100 (hereinafter, "operator biological information"). The operator information may include information relating to an operator's state (e.g., behavior, orientation, line of sight, and the like) during operation of the excavator 100 (hereinafter, "operator state information"). The operator information may include information relating to an adjustment state of a device relating to the operator (for example, the adjustment position of the operation device 26 or an adjustment position of the operator's seat and the like) (hereinafter, "operator device adjustment state information").

For example, the excavator 100 transmits operation log information including information on the maintenance of the excavator 100 (hereinafter, the "maintenance information") to the management apparatus 200 through the communication device 70.

The maintenance information includes information relating to the maintenance history, including the timing of maintenance (e.g., date, month, year) such as oil change or oil filter change of the engine 11, hydraulic oil change or hydraulic oil filter change of a hydraulic driving system and the like. The maintenance information may be automatically registered in a controller 30 in accordance with the implementation of maintenance, or may be manually registered in the controller 30 by a service person and the like through the input device 52 (see FIG. 5) in accordance with the implementation of maintenance.

For example, the excavator 100 may transmit operation log information including posting information relating to the excavator 100 manually input through the input device 52 (hereinafter, "VOC (Voice of Customer) information") to the management apparatus 200 through the communication device 70 by an operator and the like. The VOC information may include sound information corresponding to the speech content of an operator and the like in the cabin 10. For example, an operator and the like (an excavator-related user) may input the VOC information according to an operation through the input device 52 on the operation screen (hereinafter, the "posting screen") for posting the VOC information displayed on the display device 50. The operator may also be able to exchange opinions in chat format with the management apparatus 200 (e.g., the operator of the management apparatus 200 or an interactive AI (Artificial Intelligence) embedded in the management apparatus 200 and the like) on the posting screen. Accordingly, the management apparatus 200 (a manufacturer point granting unit 2104C described later) can grant points to an operator based on the contents of the VOC information. In this case, the points granted to the operator may be a fixed amount for the posting of the VOC information, or, for example, the number of points may be determined by considering the quality and quantity and the like of the VOC information at the time of exchanging opinions. The VOC information may also be posted from the user terminal 300. In this case, similar to the case of the display device 50, a display device 340 of the user terminal 300 may display the aforementioned posting screen or a GUI for chat type opinion exchange. This allows the operator to post VOC information from his/her user terminal 300 after the excavator 100 is stopped. Thus, the convenience of the operator can be improved. That is, the operator can post VOC information to the management apparatus 200 through a terminal device (example of the user terminal) configured by the controller 30, the display device 50, the input device 52, the communication device 70, and the like mounted on the excavator 100, or through the user terminal 300.

Note that, on the posting screen of the display device 50, operations other than input of the posting information may be performed. For example, on the posting screen, requests, inquiries, reports of trouble, requests for communicating to service personnel for addressing trouble or failures and the like, to the management apparatus 200 by an operator, may be performed.

<Overview of Management Apparatus>

As illustrated in FIG. 1, the management apparatus 200 (an example of the information processing apparatus) is communicatively connected to the excavator 100, the user terminal 300, and the like through a communication device 220 (see FIG. 5).

The management apparatus 200 may be, for example, a server device (cloud server) provided in a management center and the like external to the worksite where the excavator 100 performs work. The management apparatus 200 may be, for example, a server device (edge server) installed in a facility (e.g., a temporary office) within a worksite where the excavator 100 performs work or a location (e.g., a base station or station building of a communication carrier) relatively close to the worksite. In this case, a plurality of the management apparatuses 200 may be provided. The management apparatus 200 may be, for example, a terminal device. The terminal device may be, for example, a stationary terminal device, such as a desktop-type computer terminal and the like, or a portable terminal, such as a tablet terminal, laptop-type computer, and the like.

The management apparatus 200 acquires the operation log information uploaded from the excavator 100 and, when the acquired operation log information (for example, the operation log information group between the activation and the stop of the excavator 100) satisfies the evaluation condition, the management apparatus 200 performs a process of providing an incentive (points) to the excavator-related user. Thus, the management apparatus 200 can grant an incentive (points) to the excavator-related user as compensation for uploading information relating to the excavator 100 that satisfies the evaluation condition. Accordingly, the management apparatus 200 can prompt (encourage) the operator to upload information that satisfies the evaluation condition from the excavator 100. Accordingly, the management apparatus 200 can more efficiently collect information satisfying the evaluation condition from the excavator 100. The evaluation condition, and the like, is described below (see FIGS. 4A to 4C).

The management apparatus 200 manages the points granted to the excavator-related user and transmits, to the user terminal 300, the information (hereinafter, "the point information") relating to the points granted to the excavator-related user corresponding to the user terminal 300, in response to a request signal from the user terminal 300. The point information may include information on the history of the grant and use of points (hereinafter, "point history information") and information on the current balance of points (hereinafter, "point balance information") and the like. Accordingly, the management apparatus 200 can provide, through the user terminal 300, information such as the history of granted points and the balance of points and the like to an excavator managing user using the user terminal 300.

<Overview of User Terminal>

As illustrated in FIG. 1, the user terminal 300 is used by an excavator-related user.

The user terminal 300 may be, for example, a portable terminal such as a cellular phone, a smartphone, a tablet terminal, a laptop-type computer terminal, and the like. The user terminal 300 may be, for example, a stationary terminal, such as a desktop-type computer terminal and the like installed in a temporary office at a worksite and the like.

The user terminal 300 is communicatively connected to the management apparatus 200 through a communication device 320 (see FIG. 5).

The user terminal 300 provides point information downloaded from the management apparatus 200 to the excavator-related user through the display device 340 (see FIG. 5) based on bidirectional communication with the management apparatus 200. Specifically, the user terminal 300 transmits a request signal requesting point information to the management apparatus 200 in accordance with a predetermined operation input of the excavator-related user through the operation input device 330 (see FIG. 5). The user terminal 300 receives the point information that is returned from the management apparatus 200 in response to the request signal, and displays the received point information on the display device 340. Thus, the user terminal 300 can present point information to the excavator-related user.

<Overview of Forklift>

As described above, the information collection system SYS may include one or more of the forklifts 500 in place of or in addition to the excavator 100.

As illustrated in FIGS. 2A and 2B, the forklift 500 includes a vehicle body 501, a pair of forks constituted by a left fork and a right fork 502, an elevating body 503, a pair of masts constituted by a left mast and a right mast 504, a pair of front wheels constituted by a left front wheel and a right front wheel 505, a pair of rear wheels constituted by a left rear wheel and a right rear wheel 506, a steering seat 508, and a steering unit 510. Further, the forklift 500 includes a controller 530, a display device 550, an input device 552, and a communication device 570.

The forks 502 are provided at the left and right ends to extend forward at the front end of the forklift 500.

The elevating body 503 is driven, for example, by a hydraulic actuator (not illustrated) to move up and down along the masts 504. The forks 502 are attached to the elevating body 503. This allows the forks 502 to move up and down in accordance with the up and down movement of the elevating body 503.

The masts 504 are provided at left and right ends at the front end of the vehicle body 501. The left and right masts 504 are each installed in an upright position extending from a height position relatively close to the ground to a height position somewhat away from the ground. This allows the elevating body 503 to move the pair of forks 502 up and down from a height position relatively close to the ground to a height position somewhat away from the ground. Therefore, the forklift 500 may, for example, lift and move the cargo carried on a pallet together with pallet, or stack the cargo together with pallet.

The front wheels 505 are, for example, driving wheels and are electrically driven, for example, by motor power.

The rear wheels 506 are, for example, driven and steerable and are configured to be steerable through a steering mechanism. This allows the forklift 500 to change the traveling direction.

The steering seat 508 is located on the top part of the vehicle body 501.

The steering unit 510 is provided at the front end of the vehicle body 501 between the steering seat 508 and the masts 504. The steering unit 510 includes an ignition switch 511, a steering wheel 512, a lift lever 513, an accelerator pedal 514, a brake pedal 515, a forward/backward lever 516, and a dashboard 517.

The ignition switch 511 is operating means used to activate the forklift 500.

The steering wheel 512 is mechanically connected to the steering mechanism and is operating means used to steer the forklift 500.

The lift lever 513 is operating means used to raise and lower the elevating body 503.

The accelerator pedal 514 is operating means used to adjust the rotation speed of the driving wheels (e.g., front wheels), i.e., the traveling speed of the forklift 500. The operator can adjust the traveling speed of the forklift 500 by adjusting the amount of stepping on the accelerator pedal 514.

The brake pedal 515 is operating means used to brake the front wheels 505 and the rear wheels 506. By stepping on the brake pedal 515, the operator can generate a braking force on the forklift 500 during traveling or maintain the forklift 500 in a stopped state;

The forward/backward lever 516 is operating means used to switch the traveling direction of the forklift 500 between forward traveling and backward traveling.

The controller 530 is mounted, for example, on the vehicle body 501 to perform control relating to the forklift 500.

The display device 550 is provided, for example, in a position that is above the dashboard 517 and in front of the steering wheel 512. The display device 550 displays various information images to an operator.

The input device 552 receives various inputs from an operator. The input device 552 includes, for example, an operation input device positioned adjacent the right side of the display device 550. The input device 552 may also include, for example, a sound input device or a gesture input device for receiving sound input or gesture input and the like from an operator.

The communication device 570 connects to a predetermined communication network and communicates with the outside of the forklift 500 (e.g., the management apparatus 200).

In the information collection system SYS, the controller 530, the display device 550, the input device 552, and the communication device 570 perform the same functions as the controller 30, the display device 50, the input device 52, and the communication device 70 of the excavator 100 to be described later.

<Overview of Crawler Crane>

As described above, the information collection system SYS may include one or more of the crawler cranes 600 in place of or in addition to the excavator 100.

Figure 3:
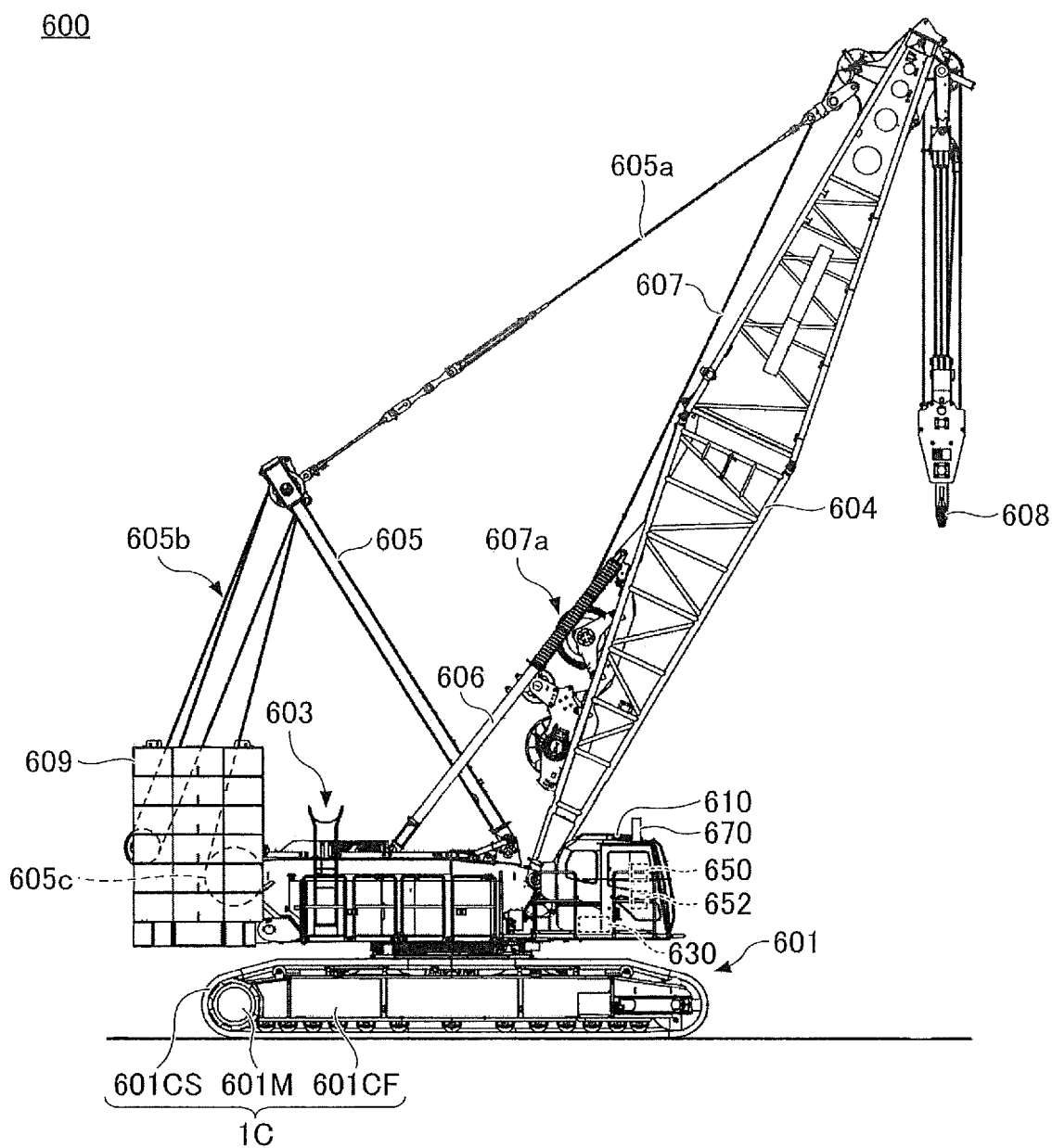
FIG. 3 is a diagram illustrating an example of a crawler crane.

As illustrated in FIG. 3, the crawler crane 600 includes a lower traveling body 601, an upper turning body 603 which is turnably mounted to the lower traveling body 601 via a turning mechanism 602, a boom 604, a mast 605, a back stop 606, a main winding rope 607, a hook 608, a counterweight 609, and a cabin 610. The crawler crane 600 also includes a controller 630, a display device 650, an input device 652, and a communication device 670.

The lower traveling body 601 includes a track frame 601TF supporting the upper turning body 603 and a pair of left and right crawlers 601C (a left crawler 601CL and a right crawler 601CR) mounted to the left and right sides of the track frame 601TF.

The crawlers 601C (the crawler 601CL, the crawler 601CR) include crawler frames 601CF (a left crawler frame 601CFL and a right crawler frame 601CFR), traveling hydraulic motors 601M (a left traveling hydraulic motor 601ML and a right traveling hydraulic motor 601MR), and crawler shoes 601CS (a left crawler shoe 601CSL and a right crawler shoe 601CSR).

The crawler frames 601CFL and 601CFR are mounted on the left and right sides of the track frame 601TF, respectively. The crawler frames 601CFL, 601CFR support the crawler shoes through the upper and lower rollers, the idling wheels at the front end, and the driving wheels at the rear end.

The traveling hydraulic motors 601ML and 601MR are mounted on the rear end of the crawler frames 601CFL and 601CFR, respectively, and drive the crawler shoes 601CSL and 601CSR through the driving wheels. That is, the lower traveling body 601 travels by the hydraulic driving of the respective crawlers 601CL and 601CR by the traveling hydraulic motor 601ML and the traveling hydraulic motor 601MR.

The upper turning body 603 is turned relative to the lower traveling body 601 by the turning mechanism 602 being hydraulically driven by the turning hydraulic motor.

The boom 604 is mounted at the front center of the upper turning body 603 so as to perform a derricking motion. The main winding rope 607 hangs from the leading end of the boom 604, and the hook 608 is attached to the leading end of the main winding rope 607.

The mast 605 is rotatably mounted about a rotation shaft parallel to the rotation shaft of the boom 604, slightly behind the base end of the boom 604 of the upper turning body 603. The leading end of the mast 605 is connected to the leading end of the boom 604 via a pendant loop 605a, and the boom 604 performs a derricking motion via the mast 605 according to the winding and unwinding of a boom derricking rope 605b by a hydraulically driven boom derricking winch 605c.

The base end of the back stop 606 is rotatably mounted about a rotation shaft parallel to the rotation shaft of the boom 604 at a portion of the upper turning body 603 behind the base end of the boom 604, and the leading end of the back stop 606 is rotatably mounted about a rotation shaft parallel to the rotation shaft of the boom 604 at a rear surface portion between the base end and the leading end of the boom 604. The back stop 606 extends and contracts in response to the derricking motion of the boom 604 and, for example, functions to support the boom 604 from the back when the boom 604 is substantially upright.

The base end of the main winding rope 607 is attached to a main winding winch 607a attached to a rear surface portion of the boom 604 between the base end and the leading end of the boom 604, and the leading end of the main winding rope 607 is attached to the hook 608. The hook 608 can be raised or lowered by the winding and unwinding of the main winding rope 607 caused by the main winding winch 607a, which is hydraulically driven.

The hook 608 is attached to the leading end of the main winding rope 607 and is used to suspend a hanging load.

The counterweight 609 is provided at the rear end of the upper turning body 603 and serves to balance the weight of the boom 604 and the hanging load.

The cabin 610 is an operating room in which an operator is to be seated. The cabin 610 is mounted to the right front end of the upper turning body 603. Inside the cabin 610 are a steering seat, operating devices (e.g., operation levers, operation pedals, and the like) for operating hydraulic actuators (e.g., the traveling hydraulic motors 601ML, 601MR, the turning hydraulic motors, hydraulic motors for driving various winches, and the like).

The controller 30 is provided, for example, inside (in the interior of) the cabin 10 to perform control relating to the crawler crane 600.

The display device 650 is provided in a location that is easily visible from an operator within the cabin 10 to display various information images to the operator.

The input device 652 is provided within the cabin 10 for receiving various inputs from an operator. The input device 652 includes, for example, an operation input device that receives an operation input from an operator. The input device 652 may also include, for example, a sound input device or a gesture input device for receiving sound input or gestures from an operator.

The communication device 670 is provided, for example, on top of the cabin 10 and connects to a predetermined communication network to communicate with the outside of the crawler crane 600 (e.g., the management apparatus 200).

In the information collection system SYS, the controller 630, the display device 650, the input device 652, and the communication device 670 perform the same functions as the controller 30, the display device 50, the input device 52, and the communication device 70 of the excavator 100 to be described later.

[Overview of Point Granting]

Figure 4A:
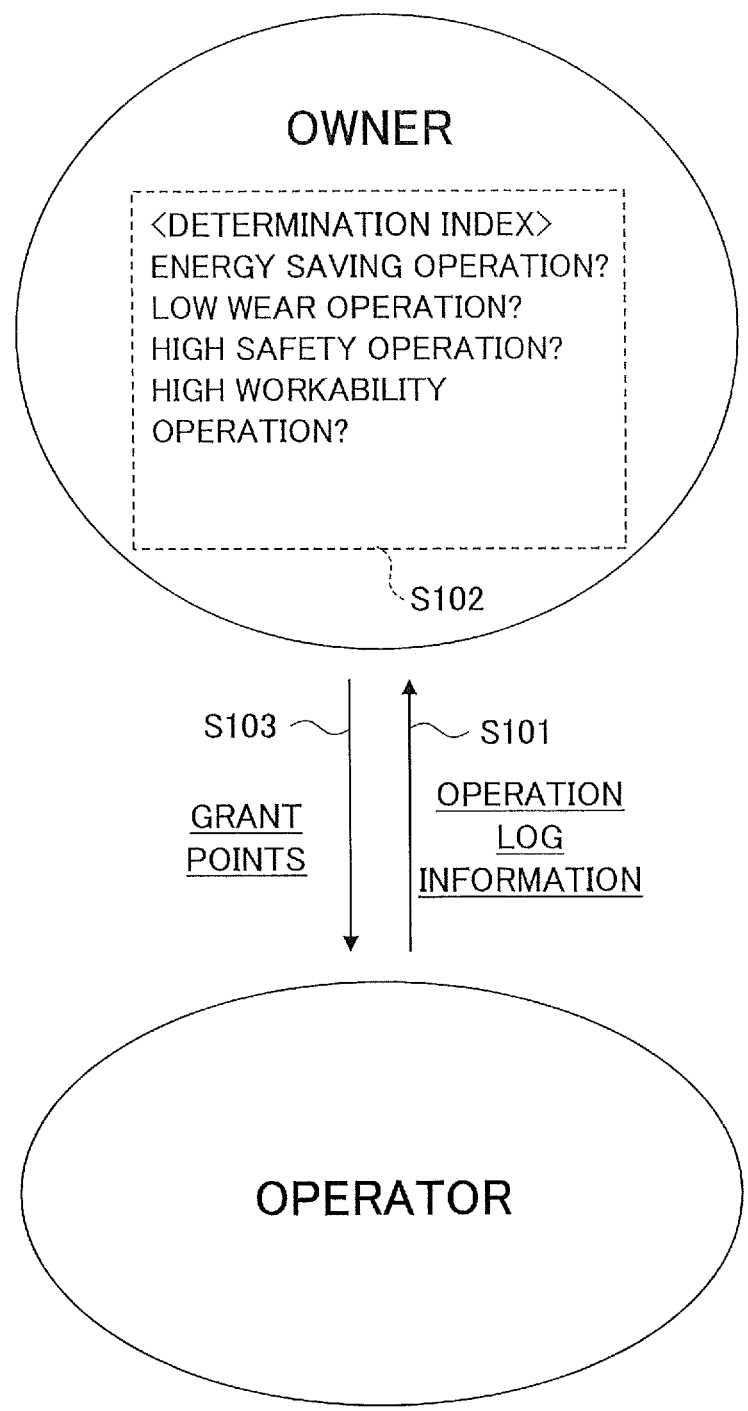
FIG. 4A is a conceptual diagram illustrating a first example of the relationship between information collection and point granting in an information collection system.
Figure 4B:
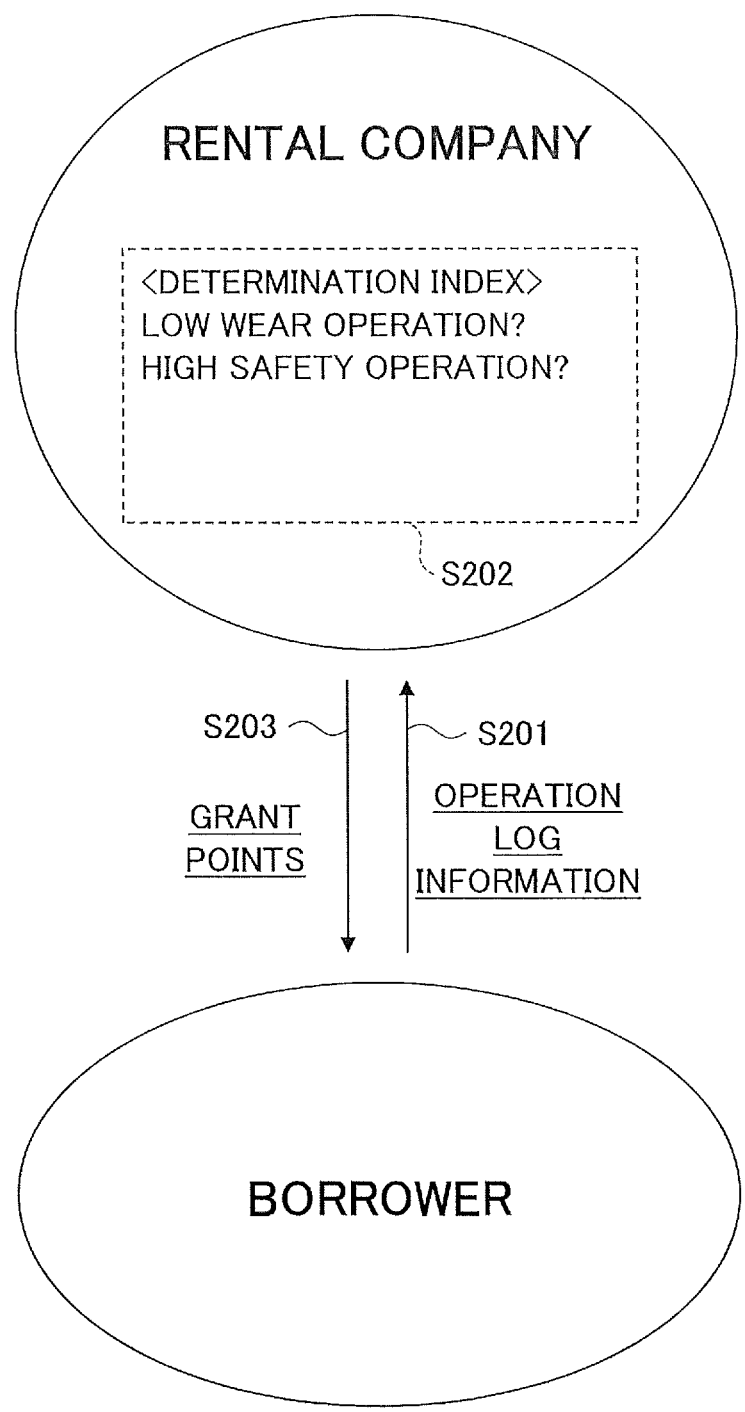
FIG. 4B is a conceptual diagram illustrating a second example of the relationship between information collection and point granting in an information collection system.

Referring now to FIG. 4 (FIGS. 4A to 4C), the concept of the granting points to the excavator-related user will be described. Hereinafter, in this section, the process performed by the excavator 100 and the management apparatus 200 will be conceptually described as a direct exchange between the point contributor who contributes the funds for the points and the excavator-related user and a direct determination by the point contributor.

(First Example of Granting Points)

FIG. 4A is a conceptual diagram illustrating a first example of a relationship between collecting information and granting points in the information collection system SYS;

As illustrated in FIG. 4A, in the present example, the owner of the excavator 100 is the point contributor and points are granted to an operator of the excavator 100 who is the excavator-related user.

In step S101, the operator of the excavator 100 provides the owner of the excavator 100 with the operation log information of the excavator 100 (e.g., the operation log information group between activation and stop of the excavator 100).

The process of step S101 is actually performed by an operation log information transmitting unit 306 (see FIG. 5) of the excavator 100. Hereinafter, the same will apply to the processes of step S201 of FIG. 4B and step S301 of FIG. 4C.

In step S102, the owner of the excavator 100 determines whether the acquired operation log information satisfies the evaluation condition for granting points (hereinafter, the "owner evaluation condition").

The owner evaluation condition may include, for example, "an operation state of the excavator represents a relatively high energy saving property (for example, relatively good fuel efficiency)" (hereinafter, "energy saving condition"). This is because the higher the energy saving property, the lower the cost (fuel cost) of the excavator 100. Further, the owner evaluation condition may include, for example, "an operation state of the excavator 100 represents a relatively low wear degree" (hereinafter, the "wear degree condition"). This is because the lower the wear degree of the excavator 100, the lower the likelihood of failure of the excavator 100 and the lower the cost of maintenance. Further, the owner evaluation condition may include, for example, "an operation state of the excavator 100 represents relatively high safety (hereinafter, "the safety condition"). This is because the higher the safety, the lower the accident rate of the excavator 100. Further, the owner evaluation condition may include, for example, "an operation state of the excavator 100 represents relatively high workability (work efficiency)" (hereinafter, the "workability condition").

This is because the higher the workability of the excavator 100, the shorter the running time of the excavator 100.

The process of step S102 is actually performed by an owner determining unit 2103B (see FIGS. 5 and 6) of the management apparatus 200. For example, the owner himself/herself determines the owner evaluation condition and entrusts the process of granting points based on the owner evaluation condition determined by the owner himself/herself to the operator of the information collection system SYS (e.g., management company). Accordingly, the owner determining unit 2103B of the management apparatus 200 can operate a mechanism of granting points in accordance with an owner evaluation standard (owner evaluation condition) in accordance with the intention of the owner of the excavator 100.

The function of the owner determining unit 2103B may be transferred to a computer terminal (hereinafter, the "owner terminal") owned by the owner of the excavator 100. In this case, the operation log information is transmitted to the owner terminal directly from the excavator 100 or via the management apparatus 200. In this case, the owner may operate the owner terminal himself/herself and set (change) the owner evaluation condition according to the evaluation standard considered by the owner.

In step S103, the owner of the excavator 100 grants points to an operator when the acquired operation log information satisfies the owner evaluation condition. The amount of points granted may be fixed or varied depending on the contents of the operation log information (e.g., degrees of energy saving performance, wear, safety, workability, and the like). For example, the amount of points granted may be increased as the energy saving performance of the excavator 100 represented by the operation log information is higher, the wear degree of the excavator 100 represented by the operation log information is lower, the safety of the excavator 100 represented by the operation log information is higher, or the workability of the excavator 100 represented by the operation log information is higher.

The process of step S103 is actually performed by an owner point granting unit 2104A of the management apparatus 200.

The points granted to the operator may be, for example, of a mechanism which is capable of compensating for the costs of shopping, and the like, within the point program or via other point programs. The points granted to the operator may be of a mechanism which can convert the points into cash within the point program or via other point programs. The points granted to the operator may be of a mechanism which can pay monetary compensation from the owner after the fact.

This will cause the operator of the excavator 100 to attempt to operate the excavator 100 to satisfy the evaluation condition in order to receive points. Accordingly, by granting points, the owner of the excavator 100 can prompt an operator to perform an operation with high energy saving performance, low wear consumption, high safety, and high workability and the like.

(Second Example of Granting Points)

FIG. 4B is a conceptual diagram illustrating a second example of the relationship between information collection and point granting in the information collection system SYS.

As illustrated in FIG. 4B, in the present example, the renter (i.e., the rental provider) of the excavator 100 (e.g., a rental company) is the point contributor and points are granted to the borrower of the excavator 100 that is the excavator-related user.

In step S201, the borrower of the excavator 100 provides the rental provider of the excavator 100 with operation log information of the excavator 100 (e.g., operation log information group between activation and stop of the excavator 100).

In step S202, the rental provider of the excavator 100 determines whether the acquired operation log information satisfies the evaluation condition for granting points (hereinafter, the "rental provider evaluation condition").

The rental provider evaluation condition may include, for example, a wear degree condition and a safety condition.

The process of step S202 is actually performed by a renter determining unit 2103C (see FIGS. 5 and 6) of the management apparatus 200.

In step S203, the rental provider of the excavator 100 grants points to the borrower when the acquired operation log information satisfies the rental provider evaluation condition. The amount of points granted may be fixed or may vary depending on the content of the operation log information (e.g., degree of wear, safety, and the like). For example, the amount of points to be granted may be increased in accordance with how low the wear is on the excavator 100 represented by the operation log information, or in accordance with how high the safety is of the excavator 100 represented by the log information.

The process of step S203 is actually performed by a renter point granting unit 2104B of the management apparatus 200.

The points to be granted to the borrower of the excavator 100 may be, for example, of a mechanism capable of covering the cost of borrowing a work machine, such as the excavator 100 and the like, from the next time and onwards from the rental provider of the excavator 100. The points granted to the borrower of the excavator 100 may be, for example, of a mechanism which is capable of compensating for the costs of shopping, and the like, other than the rental of a work machine, within the point program or via other point programs. The points granted to the borrower of the excavator 100 may be of a mechanism which can convert the points into cash within the point program or via other point programs. The points granted to the borrower of the excavator 100 may be of a mechanism which can provide cash back from the rental provider of the excavator 100 after the fact.

This will cause the borrower of the excavator 100 to attempt to operate the excavator 100 to satisfy the evaluation condition in order to receive points. Accordingly, by granting points, the rental provider of the excavator 100 can prompt the borrower to perform an operation with low wear consumption, high safety, and the like.

(Third Example of Granting Points)

FIG. 4C is a conceptual diagram illustrating a third example of the relationship between information collection and point granting in the information collection system SYS.

As illustrated in FIG. 4C, in the present example, the manufacturer of the excavator 100 is the point contributor and points are granted to the owner of the excavator 100 or the operator of the excavator 100 who is the excavator-related user. In this case, the owner of the excavator 100 may include a rental provider (e.g., a rental company) who both owns and rents out the excavator 100. The operator of the excavator 100 may include a borrower of the excavator 100 who has borrowed the excavator 100 from a rental provider of the excavator 100.

Note that whether the owner of the excavator 100 is the target of granting points or the operator of the excavator 100 is the target of granting points may be predetermined, for example, based on a contract between an operator of the information collection system SYS (e.g., the management company) and the owner of the excavator 100.

In step S301, the owner or the operator of the excavator 100 provides operation log information of the excavator 100 (e.g., operation log information group from the activation to the stop of the excavator 100) to the manufacturer of the excavator 100.

In step S302, the manufacturer of the excavator 100 determines whether the acquired operation log information satisfies the evaluation condition for granting points (hereinafter, the "manufacturer evaluation condition").

The manufacturer evaluation condition includes "useful information included" (useful information condition). Useful information, for example, is predefined as a minimum data set (an example of a first type of information) from among a plurality of types of information that may be acquired as operation log information by the excavator 100, in consideration of the viewpoint of use in development, the viewpoint of use in sales, and the viewpoint of use in inspection and maintenance.

The process of step S302 is actually performed by a manufacturer determining unit 2103D (see FIG. 5) of the management apparatus 200.

In step S303, the manufacturer of the excavator 100 grants points to the owner or the operator of the excavator 100 when the acquired operation log information satisfies the manufacturer evaluation condition. The amount of points granted may be fixed or may be varied depending on the content of the operation log information (e.g., a large number of types of information included in the operation log information, the presence or absence of a predefined particular type of information (an example of a second type of information) and the like). For example, the amount of points granted may be increased as the number of types of information included in the operation log information increases. Also, the amount of points granted may be relatively increased when a predefined particular type of information is included. In this case, the particular type of information may be modified periodically. This makes it easier to collect a particular type of information within a limited period of time.

The minimum data set and the particular type of information (hereinafter, "useful information" as a matter of convenience of explanation) may include, for example, image information of an imaging device that captures the appearance of the surroundings of the excavator 100. Accordingly, the developer of the manufacturer, and the like, can associate the information relating to the operation state or the motion state of the excavator 100 included in the operation log information with the actual work status of the excavator 100. Therefore, for example, it is possible to perform an analysis of which one of the various states (for example, a state where the pressure of the boom cylinder 7 rises rapidly) occurs in the excavator 100 under what kind of work status (for example, a stone is tapped with the bucket 6 instead of soil and the like) and the like. Further, by acquiring image information of various worksites, the developer of the manufacturer and the like can create, for example, teacher data for creating a learned model of object recognition at the worksite.

Useful information may also include information relating to the worksite (e.g., the contractor executing the work; the name, position coordinates, address, work, information, and the like, of the worksite) together with image information. This allows the association of a particular worksite with the actual situation of this worksite that can be identified from the image information.

The useful information may also include information relating to the operator (e.g., operator identification information and the like) and information relating to the operation. This allows for selective acquisition of information relating to, for example, the operation of a skilled operator. For example, a determination index for determining whether an operator is a skilled operator, such as the number of years of driving and driving hours of the operator and the like may be registered at the time of user registration to the information collection system SYS. In this case, a setting may be such that, for a skilled operator (e.g., an operator with more than 10 years of driving experience), the number of granted points is relatively large. Thus, the information collection system SYS (the management apparatus 200) further facilitates the collection of information relating to the operation of a skilled operator.

The useful information may also include information relating to the safety of the excavator 100. Specifically, the information relating to the safety of the excavator 100 may include information by which it is possible to determine the occurrence of an event relating to the safety of the excavator 100 (e.g., the overturn of the excavator 100, contact with an object around the excavator 100, and the like). Such information may include image information of the imaging device described above, information relating to the orientation of the excavator 100, information relating to the acceleration of the excavator 100 (machine body), and the like. The information relating to the safety of the excavator 100 may also include particular operation information or motion information relating to the safety of the excavator 100. Such information may include, for example, information relating to the rapid operation of the operation device 26, information relating to the sudden braking or sudden acceleration of a driven element (actuator), information relating to vibration (e.g., information relating to acceleration), and operation information or motion information of the excavator 100 when a monitored object (e.g., a person) is detected in an adjacent region around the excavator 100.

Further, useful information may include information on the energy saving of the excavator 100. Information on the energy saving of the excavator 100 includes fuel consumption of the engine 11 and the amount of regenerated energy when power regeneration or hydraulic regeneration (including hydraulic production) is performed and the like.

The useful information may also include information relating to the workload of the excavator 100. Information on the workload of the excavator 100 may include payloads, weight of earth and sand, volume of earth and sand, and the like Information relating to the workload of the excavator 100 may also include the weight or volume (e.g., cumulative value for a predetermined period, and the like) of the earth and sand conveyed or piled by the excavator 100. Further, the information on the workload of the excavator 100 includes the terrain shape data before the start of work in the worksite (e.g., before the start of work on each work day or before the start of work on the first day of work) and the aim work data corresponding to the work aim. This is because the workload of the excavator 100 can be estimated from the differential data between the aforementioned two data items.

The useful information may also include information relating to the degree of wear of the excavator 100. Information on the degree of wear of the excavator 100 may include information on the inspection and maintenance history. Information on the degree of wear of the excavator 100 may also include information on the presence or absence of operations not recommended in terms of wear and tear, such as an operation to sweep the ground with the leading end of the attachment (the bucket 6) while turning the upper turning body 3, jack-up operations, operations to hit a relatively hard object with the claw tip of the bucket 6, and the like. Information on the degree of wear of the excavator 100 may also include information on the automatic supply situation of grease to an operating axis, such as boom pins, arm pins, and bucket pins of the attachment and the like.

Useful information may also include information relating to the work (construction) site. The information on the worksite may include the landform shape data prior to the start of the work on the worksite and the work aim data corresponding to the work aim. Information on the worksite includes information on the number of other work machines used in the worksite (other excavators, bulldozers, trucks, and the like). Information on the worksite includes information on the number of workers assigned to the worksite. Information on the worksite includes information on the work schedule at the worksite. This information may be acquired, for example, from output information of the surrounding information acquiring device 42 (e.g., imaging device, LIDAR (Light Detection and Ranging) and the like) in the excavator 100. Further, the work aim data or the work schedule and the like of the worksite may be acquired in the excavator 100, for example, from a predetermined external device. Accordingly, the manager of the management apparatus 200 and the worker and the like (for example, the developer and the service person of the manufacturer, and the like) (hereinafter, the manager, and the like) can acquire useful information (useful data set) for each worksite, for example. Thus, for example, the manager and the like of the management apparatus 200 may perform analysis to propose a work plan, necessary personnel (operators, workers, and their proficiency) and the like for a particular worksite. The manufacturer who acquires this useful information may also obtain a compensation (e.g., money) by providing this useful information (datasets) to the contractor of the worksite (e.g., construction contractor of a general contractor and the like) or to the rental provider who rents multiple work machines including the excavator 100 at the worksite. In this case, the management apparatus 200 may perform a process in a manner in which the contractor of the worksite contributes points and grants the points to the manufacturer as in the present embodiment.

The image information of the excavator 100 may be recorded at a particular timing. For example, image information may be periodically recorded and uploaded as operation log information in situations where no one is present according to image recognition based on image information. Accordingly, the manager of the management apparatus 200 and the worker and the like can perform fixed-point observation of a worksite by using the image information group. For example, image information may be recorded in advance and uploaded as operation log information when an unexpected event occurs (for example, when an unexpected operation is performed, when a pulse-like pressure is generated in the hydraulic actuator, or when the turning of the upper turning body 3 stops abruptly and the like). Accordingly, the manager of the management apparatus 200 and the like can associate the unexpected event with the actual situation of the worksite that can be identified from the image information. Further, the image information of the excavator 100 may be recorded before and after the start and stop of the turning motion of the upper turning body 3 or the traveling motion of the lower traveling body 1 as triggers, and may be uploaded as operation log information. Accordingly, the manager of the management apparatus 200 and the like can identify the safety situation of the worksite when the upper turning body 3 of the excavator 100 is turning or when the lower traveling body 1 of the excavator 100 is traveling, and the situation of the operation of the safety function of the excavator 100 (for example, an alarm when an object at a short distance is detected and the like) and the like.

The process of step S303 is actually performed by the manufacturer point granting unit 2104C of the management apparatus 200.

The points granted to the owner or the operator may be, for example, of a mechanism which is capable of compensating for the costs of shopping, and the like, within the point program or via other point programs. The points granted to the owner or the operator may be of a mechanism which can convert the points into cash within the point program or via other point programs. Further, the points granted to the owner may be of a mechanism which can provide cash back from the manufacturer after the fact. The points granted to the owner may be of a mechanism which is capable of compensating for the cost of inspection and maintenance of the excavator 100 by the manufacturer. The points granted to the operator may be of a mechanism which can pay monetary compensation from the manufacturer via the owner after the fact.

Accordingly, the owner or the operator of the excavator 100 will upload the operation log information corresponding to the time when the excavator 100 is running, to the management apparatus 200 in order to receive points. Accordingly, the manufacturer of the excavator 100 can efficiently collect operation log information corresponding to the time when the excavator 100 is running.

[Configuration of Information Collection System]

Next, the configuration of the information collection system SYS (the excavator 100, the management apparatus 200, and the user terminal 300) according to the present embodiment will be described with reference to FIGS. 5 and 6 in addition to FIGS. 1 and 4A to 4C.

FIG. 5 is a block diagram illustrating an example of the configuration of the information collection system SYS according to the present embodiment. FIG. 6 is a functional block diagram illustrating a process from information collection to point granting in the information collection system SYS according to the present embodiment.

In FIG. 5, the mechanical power line is represented by a double line, the high-pressure hydraulic line is represented by a thick solid line, the pilot line is represented by a dashed line, and the electric drive and control line are each represented by a thin solid line. Further, in FIG. 6, the excavator 100 includes excavators 100A to 100D. The excavator 100A corresponds to the case where the owner is a point contributor and the target of the point granting is an operator (in the case of FIG. 4A above). The excavator 100B corresponds to the case where the rental provider is the point contributor and the target of the point granting is the borrower (in the case of FIG. 4B above). The excavators 100C and 100D correspond to the case where the manufacturer is the point contributor and the target of the point granting is the owner and the operator (in the case of FIG. 4C above).

<Configuration of Excavator>
<<Hydraulic Driving System>>

The hydraulic driving system of the excavator 100 according to the present embodiment includes the traveling hydraulic motors 1A and 1B, the turning hydraulic motor 2A, the boom cylinder 7, the arm cylinder 8, and the bucket cylinder 9 for hydraulically driving the lower traveling body 1, the boom 4, the arm 5, and the bucket 6, respectively and the like. As illustrated in FIG. 5, the hydraulic driving system of the excavator 100 according to the present example includes the engine 11, a main pump 14, and a control valve 17.

The engine 11 is the main power source in the hydraulic driving system and is mounted on the rear of the upper turning body 3. The engine 11, for example, is constantly rotated at a predetermined target rotation speed under the control of the controller 30 described below. The engine 11 is, for example, a diesel engine fueled with diesel oil and drives the main pump 14 and a pilot pump 15.

The main pump 14 is mounted on the rear of the upper turning body 3 and supplies hydraulic oil to the control valve 17 through a high pressure hydraulic line 16. The main pump 14 is driven by the engine 11. The main pump 14 is, for example, a variable displacement hydraulic pump in which a regulator 14a controls the angle (tilt angle) of the swash plate under the control of the controller 30, which will be described later. Accordingly, the main pump 14 can adjust the stroke length of the piston and control the discharge flow rate (discharge pressure).

The control valve 17 is mounted in the center of the upper turning body 3 and is a hydraulic control device that controls the hydraulic driving system in response to an operator's operation of the operation device 26. As described above, the control valve 17 is connected to the main pump 14 via the high pressure hydraulic line 16 and is configured to selectively supply hydraulic oil supplied from the main pump 14 to the traveling hydraulic motors 1A and 1B, the turning hydraulic motor 2A, the boom cylinder 7, the arm cylinder 8, and the bucket cylinder 9 as hydraulic actuators. Specifically, the control valve 17 is a valve unit which includes a plurality of hydraulic control valves (directional changeover valves) for controlling the flow rate and flow direction of hydraulic oil supplied from the main pump 14 to each of the hydraulic actuators.

The excavator 100 may be remotely operated. In this case, the control valve 17 controls the hydraulic driving system in response to a signal (hereinafter, a "remote operation signal") relating to the operation of an actuator (hydraulic actuator) of the excavator 100 received from an external device (e.g., the management apparatus 200) through the communication device 70. The remote operation signal defines the actuator to be operated and the contents of the remote operation (e.g., operation direction and operation amount and the like) relating to the actuator to be operated. For example, the controller 30 outputs a control instruction corresponding to the remote operation signal to a proportional valve (hereinafter, "operation proportional valve") disposed in a predetermined hydraulic line (pilot line) connecting the pilot pump 15 and the control valve 17. Thus, the operation proportional valve can apply a pilot pressure corresponding to the control instruction, that is, a pilot pressure corresponding to the contents of the remote operation defined in the remote operation signal, to the control valve 17. Therefore, the control valve 17 can implement the operation of the hydraulic actuator according to the contents of the remote operation defined by the remote operation signal.

The excavator 100 may operate (work) autonomously, for example, without depending on an operation by an operator of the cabin 10 or by remote operation and the like. In this case, the control valve 17 controls the hydraulic driving system in accordance with a drive instruction (hereinafter, "autonomous drive instruction") which is generated by an autonomous control device which implements autonomous operation of the excavator 100 to operate an actuator (hydraulic actuator) of the excavator 100. The autonomous drive instruction defines the actuator to be operated and the operation contents (e.g., operation direction and operation amount and the like) of the actuator to be operated. That is, the control valve 17 controls the hydraulic driving system in response to operation of the autonomous hydraulic actuator by the autonomous control device. For example, the autonomous control device outputs a control instruction corresponding to an autonomously generated drive instruction, to the operation proportional valve. This allows the operation proportional valve to apply a pilot pressure corresponding to the control instruction, that is, a pilot pressure corresponding to the operation contents relating to the hydraulic actuator defined in the autonomous drive instruction, to the control valve 17. Therefore, the control valve 17 can implement the operation of the hydraulic actuator according to the operation contents defined in the autonomous drive instruction corresponding to autonomous operation generated by the autonomous control device.

Note that, when the excavator 100 performs work autonomously, the target of point granting in the case of FIG. 4C described above is uniformly the owner of the excavator 100.

<<Operation System>>

As illustrated in FIG. 5, the operation system of the excavator 100 according to the present example includes the pilot pump 15, the operation device 26, and a pressure sensor 29.

The pilot pump 15 is mounted on the rear of the upper turning body 3 and supplies pilot pressure to the operation device 26 via a pilot line 25. The pilot pump 15 is, for example, a fixed displacement hydraulic pump, and is driven by the engine 11.

The operation device 26 is provided near the steering seat of the cabin 10 and is operation input means for an operator to operate the respective driven elements (e.g., the lower traveling body 1, the upper turning body 3, the boom 4, the arm 5, and the bucket 6, and the like). That is, the operation device 26 is operation input means for operating the hydraulic actuators (for example, the traveling hydraulic motors 1A and 1B, the turning hydraulic motor 2A, the boom cylinder 7, the arm cylinder 8, and the bucket cylinder 9 and the like) for driving the respective driven elements. The operation device 26 is connected to the control valve 17 via a pilot line 27 on the secondary side. Thus, the control valve 17 receives a pilot signal (pilot pressure) corresponding to the operation state with respect to the lower traveling body 1, the upper turning body 3, the boom 4, the arm 5, and the bucket 6 and the like, at the operation device 26. Thus, the control valve 17 can drive each hydraulic actuator in accordance with the operation state at the operation device 26.

Further, the operation device 26 may be an electric type. In this case, an electric signal representing the operation content (e.g., the operation direction, the operation amount, and the like) with respect to the operation device 26, is input to the controller 30. The controller 30 controls an operation proportional valve connected to the control valve 17 via a pilot line according to the content of the electrical signal, that is, the operation content with respect to the operation device 26. Accordingly, pilot pressure according to the operation content with respect to the operation device 26 is input from the operation proportional valve, and the control valve 17 can drive each hydraulic actuator according to the operation state at the operation device 26.

Note that if the excavator 100 is operated remotely or if the excavator 100 performs work autonomously, the operation device 26 may be omitted.

The pressure sensor 29 detects the pilot pressure on the secondary side (the pilot line 27) of the operation device 26, i.e., the pilot pressure corresponding to the operation state with respect to each driven element (the hydraulic actuator driving each driven element) at the operation device 26. The pressure sensor 29 is connected to the controller 30, and a pressure signal (a pressure detection value) corresponding to the operation state with respect to the lower traveling body 1, the upper turning body 3, the boom 4, the arm 5, the bucket 6 and the like at the operation device 26, is entered into the controller 30. Thus, the controller 30 can identify the operation content with respect to the operation device 26 relating to the hydraulic actuator based on the detection information of the pressure sensor 29.

When the operation device 26 is an electric type, the pressure sensor 29 is omitted. This is because the operation state at the operation device 26 is directly input to the controller 30 as an electrical signal from the operation device 26.

<<Control System>>

As illustrated in FIG. 5, the control system of the excavator 100 according to the present example includes the controller 30, an excavator state information acquiring device 40, a surrounding information acquiring device 42, an operator information acquiring device 44, a display device 50, an input device 52, and a communication device 70.

The controller 30 implements various kinds of control with respect to the excavator 100. The controller 30 may implement the functions thereof by any hardware or a combination of hardware and software. For example, the controller may be configured mainly by a computer including a processor such as a CPU (Central Processing Unit) and the like, a memory device (main memory device) such as a RAM (Random Access Memory) and the like, a non-volatile auxiliary memory device such as a ROM (Read Only Memory), and an interface device and the like. Hereinafter, the same will apply to a control device 210 of the management apparatus 200 and a control device 310 of the user terminal 300.

The functions of the controller 30 may be implemented by being distributed among a plurality of controllers.

The controller 30, for example, includes a setting screen display processing unit 301, an operation log related setting unit 302, an operation log information recording unit 304, and an operation log information transmitting unit 306 as functional units implemented by executing one or more programs installed in an auxiliary storage device, on the CPU. The controller 30 uses a setting information storage unit 303 and an operation log information storage unit 305. The setting information storage unit 303 and the operation log information storage unit 305 may be implemented, for example, by an auxiliary storage device in the controller 30 or an external storage device and the like capable of communicating with the controller 30.

The excavator state information acquiring device 40 acquires excavator state information.

The excavator state information acquiring device 40 includes various sensors for acquiring, for example, excavator motion state information or excavator orientation state information. Specifically, the excavator state information acquiring device 40 may include cylinder pressure sensors for detecting the cylinder pressure of the boom cylinder 7, the arm cylinder 8, and the bucket cylinder 9. The excavator state information acquiring device 40 may include an orientation sensor for detecting an orientation state of the upper turning body 3, the boom 4, the arm 5, the bucket 6, and the like. The orientation sensor may include a rotary encoder, an acceleration sensor (tilt sensor), an angular velocity sensor, a hexagonal sensor, an IMU (inertial measurement unit), and the like mounted to the upper turning body 3, the boom 4, the arm 5, the bucket 6, and the like. Further, the excavator state information acquiring device 40 includes a sensor (for example, a discharge pressure sensor for detecting discharge pressure and the like) for acquiring an operation state of the main pump 14.

The excavator state information acquiring device 40 includes various sensors for acquiring, for example, excavator operation state information. Specifically, the excavator state information acquiring device 40 may include a pressure sensor 29 for detecting pilot pressure corresponding to the operation content with respect to the operation device 26. The excavator state information acquiring device 40 may include a sensor (for example, a linear encoder) for detecting the operation contents, built in the operation device 26 that is an electric type.

The excavator state information acquiring device 40 may include various sensors for acquiring, for example, engine running state information. Specifically, the excavator state information acquiring device 40 may include a rotation speed sensor of the engine 11.

The controller 30 may acquire the engine running state information from a device other than the excavator state information acquiring device 40. For example, the amount of fuel injected by the engine 11 as engine running state information may be acquired from a functional unit of the controller 30 that determines the amount of fuel injected. For example, the output horsepower of the engine 11 as the engine running state information may be acquired from a functional unit of the controller 30 that calculates the output horsepower.

The surrounding information acquiring device 42 acquires the surrounding information of the excavator 100.

The surrounding information acquiring device 42 may include, for example, an outside air temperature sensor or an illumination sensor and the like. The surrounding information acquiring device 42 may include an imaging device, such as a monocular camera, a stereo camera, or a depth camera and the like, for capturing an image around the excavator 100. The surrounding information acquiring device 42 may include a sensor capable of acquiring distance information of a surrounding object such as, for example, a LIDAR, a milliwave radar, an infrared sensor, an ultrasonic sensor, and the like.

The operator information acquiring device 44 acquires the operator information.

The operator information acquiring device 44 may include, for example, an imaging device, such as a monocular camera, a stereo camera, or a depth camera and the like, for capturing an image of the interior of the cabin 10. Further the operator information acquiring device 44 may include a sensor capable of acquiring distance information of an object in the interior of the cabin 10, such as a LIDAR, a milliwave radar, an infrared sensor, an ultrasonic sensor, and the like. Further, the operator information acquiring device 44 may include a wearable biological sensor (e.g., an electroencephalogram sensor, a heart rate sensor, and the like) worn by the operator. Further, the operator information acquiring device 44 may include a sensor (for example, a linear encoder and the like) for detecting an adjustment position of the operation device 26 or an adjustment position of the operator's seat.

The display device 50 is located in a location within the cabin 10 for easy visibility by an operator to display various information images. The display device 50 is, for example, a liquid crystal display or an organic EL (electroluminescence) display.

In place of or in addition to the display device 50, other output devices capable of outputting information to an operator and the like in the interior of the cabin 10, may be provided. Other output devices may include, for example, sound output devices that output auditory information to an operator. Sound output devices include, for example, speakers, buzzers, and the like.

The input device 52 receives an input from an operator and the like and outputs, to the controller 30, a signal corresponding to a content of an operation with respect to the input device 52. The input device 52 includes, for example, an operation input device that receives an operation input from an operator. Operation input devices may include, for example, touch panels, touch pads, joysticks, button switches, keyboards, and the like. The input device 52 may also include, for example, a sound input device or a gesture input device for receiving sound input or gesture input from an operator. The sound input device includes, for example, a microphone. The gesture input device includes, for example, an imaging device capable of capturing an image of an operator's gesture.

The communication device 70 is connected to a predetermined communication network including, for example, a mobile communication network having a base station as a terminal, a satellite communication network using a communication satellite, an Internet network and the like, and communicates with an external device such as the management apparatus 200 and the like.

The setting screen display processing unit 301 displays, on the display device 50, an operation screen (hereinafter, the "operation log related setting screen") for making settings relating to transmission (upload) of operation log information to the management apparatus 200.

The operation log related setting unit 302 makes settings relating to the transmission (upload) of the operation log information to the management apparatus 200 in accordance with predetermined input from an operator or an owner and the like through the input device 52 on the operation log related setting screen.

For example, the operation log related setting unit 302 sets approval or disapproval that the operation log information is transmitted to the management apparatus 200 in accordance with predetermined input from an operator or an owner and the like. Accordingly, the operator, owner, and the like of the excavator 100 can perform an operation of approving or disapproving the transmission of the operation log information to the management apparatus 200 on the operation log related setting screen. For example, the operation log related setting unit 302 sets the type of information to be transmitted to the management apparatus 200 as operation log information in accordance with a predetermined input from an operator or an owner and the like. Accordingly, the operator, the owner, and the like of the excavator 100 can set and operate the type of the information to be transmitted to the management apparatus 200 on the operation log related setting screen. The type of information to be transmitted to the management apparatus 200 may be selected to be any one of the excavator state information, the surrounding information, and the operator information, or may be selected to be two or more of these types of information. That is, the type of information to be transmitted to the management apparatus 200 may be arbitrarily set in a manner that includes at least one of the excavator state information, the surrounding information, or the operator information.

It may be difficult to set each and every type of information to be uploaded to the management apparatus 200 by the operator or the owner and the like of the excavator 100. Thus, the controller 30 may allow an excavator-related user to select whether to upload each data set at a time, with the minimum unit corresponding to a single group of types (data set) formed by bringing together a certain number of types of information among all types of information that are selectable. Further, the controller 30 may display, on the display device 50, a push notice (operation log related setting screen) asking whether uploading is possible for each data set, at appropriate time intervals. This is because it may be troublesome for the excavator-related user to make a comprehensive selection, even when the selection is for uploading each data set at a time. Further, upon approval to transmit the operation log information to the management apparatus 200, through the operation log related setting screen of the display device 50, the controller 30 may provide, to the excavator-related user, an option for transmitting all types of information that can be uploaded. This is because there may be an excavator-related user who does not care about the type of information to be uploaded, and this excavator-related user can be saved of the trouble. Further, the approval to transmit the operation log information to the management apparatus 200 and the selection of the type of the information to be transmitted and the like may be implemented through the user terminal 300. This allows the excavator-related user to make the various settings described above without boarding the excavator 100.

The setting information storage unit 303 registers (stores) the setting contents relating to the transmission of the operation log information to the management apparatus 200 set by the operation log related setting unit 302.

The operation log information recording unit 304 records the operation log information in the operation log information storage unit 305 while the excavator 100 is running, that is, from the activation to the stop of the excavator 100. Specifically, the operation log information recording unit 304 refers to the setting contents in the setting information storage unit 303 and identifies the type of information to be recorded, that is, the type of information to be transmitted as the operation log information to the management apparatus 200. The operation log information recording unit 304 records the information of the identified type in the operation log information storage unit 305 at every predetermined recording cycle.

The operation log information storage unit 305 stores the operation log information when the excavator 100 is running, for example, from the activation to the stop of the excavator 100. That is, the operation log information storage unit 305 stores records (history) in time series of the operation log information at every recording cycle of the operation log information recording unit 304. Specifically, the operation log information storage unit 305 may store a record of operation log information including information relating to a recording date and time (for example, a time stamp at the time of recording), identification information of the excavator 100 (for example, an excavator ID uniquely defined for each excavator 100 and the like) (hereinafter, the excavator identification information), and the information to be transmitted. Accordingly, the operation log information storage unit 305 can hold a record group (i.e., a database) of the operation log information. If the target of the point granting is an operator of the excavator 100, the operation log information includes operator identification information corresponding to the operator operating the excavator 100. In this case, the operator who is steering the excavator 100 may be identified, for example, when the excavator 100 is activated, according to the content of a selection operation by the operator performed through the input device 52 on the operation screen for selecting an operator (hereinafter, the "operator selection screen") displayed on the display device 50. Further, an operator steering the excavator 100 may be identified (recognized) based on, for example, an image captured by a camera in the interior of the cabin 10.

The operation log information transmitting unit 306 transmits the operation log information to the management apparatus 200 in response to a request from the management apparatus 200 or at a predefined automatic transmission timing (for example, at the time of the activation or the stop of the excavator 100).

<Configuration of Management Apparatus>

As illustrated in FIG. 5, the management apparatus 200 includes the control device 210 and the communication device 220.

The control device 210 implements various kinds of control relating to the management apparatus 200. The control device 210 includes an operation log information acquiring unit 2101, a determining unit 2103, a point granting unit 2104, and a point information providing unit 2106 as functional units implemented by executing one or more programs installed in the auxiliary storage device on the CPU, for example. The control device 210 uses an operation log information storage unit 2102 and a point ledger storage unit 2105. The operation log information storage unit 2102 and the point ledger storage unit 2105 may be implemented by, for example, an auxiliary storage device in the control device 210 or an external storage device communicatively connected with the control device 210 and the like.

The communication device 220 connects to a predetermined communication network including an Internet network and the like and communicates with an external device such as the excavator 100 and the user terminal 300 and the like.

The operation log information acquiring unit 2101 (an example of an information acquiring unit) acquires the operation log information received from the excavator 100 from a receiving buffer and the like. The operation log information of the excavator 100 acquired by the operation log information acquiring unit 2101 is stored in the operation log information storage unit 2102.

The operation log information storage unit 2102 stores the operation log information acquired from the excavator 100 by the operation log information acquiring unit 2101. Specifically, in the operation log information storage unit 2102, the predetermined unit of the log information group acquired from the excavator 100 once, for example, the operation log information group corresponding to one running operation from the activation to the stop of the excavator 100, is appropriately stored in an extractable manner. The operation log information includes excavator identification information as described above. Accordingly, the operation log information storage unit 2102 can store, in a manner as to be identified, the operation log information (group) of the particular excavator 100 from among the operation log information acquired from the plurality of excavators 100. It may be possible to provide a number of the operation log information storage units 2102 corresponding to the number of the excavators 100, for each of a plurality of the excavators 100 from which the operation log information is to be acquired.

The determining unit 2103 includes a target determining unit 2103A, an owner determining unit 2103B, a renter determining unit 2103C, and a manufacturer determining unit 2103D.

The target determining unit 2103A determines the person who contributes points and the target of point granting when granting points based on the operation log information acquired from the excavator 100 by the operation log information acquiring unit 2101. For example, the relationship between the excavator 100 and the point contributor and the point granting target may be predefined. In this case, the target determining unit 2103A determines the point contributor and the point granting target based on the excavator identification information included in the operation log information (group) acquired from the excavator 100.

The owner determining unit 2103B determines whether the operation log information (specifically, the operation log information group of a predetermined unit) acquired from the excavator 100 by the operation log information acquiring unit 2101, satisfies the owner evaluation condition.

The renter determining unit 2103C determines whether the operation log information (specifically, the operation log information group of a predetermined unit) acquired from the excavator 100 by the operation log information acquiring unit 2101 satisfies the rental provider evaluation condition.

The manufacturer determining unit 2103D determines whether the operation log information (specifically, the operation log information group of a predetermined unit) acquired from the excavator 100 by the operation log information acquiring unit 2101 satisfies the manufacturer evaluation condition.

When it is determined that the evaluation condition is satisfied by the determining unit 2103 (the owner determining unit 2103B, the renter determining unit 2103C, and the manufacturer determining unit 2103D), the point granting unit 2104 (an example of an incentive granting unit) performs a process of granting points to the excavator-related user who is the point granting target. For example, a point ledger 2105A of the point ledger storage unit 2105 stores the identification information (hereinafter, the "user identification information") of the excavator-related user registered in advance, and the point history information and the point balance information associated with the user identification information. The point granting unit 2104 may grant points to the excavator-related user that is the target, by updating the point history information and the point balance information associated with the user identification information corresponding to the excavator-related user who is the target in the point ledger 2105A.

The owner point granting unit 2104A performs a process of granting points to an operator of the excavator 100 from the funds of the owner of the excavator 100.

The renter point granting unit 2104B performs the process of granting points to the borrower of the excavator 100 from the funds of the rental provider of the excavator 100.

The manufacturer point granting unit 2104C performs the process of granting points from the funds of the manufacturer of the excavator 100 to the owner or the operator of the excavator 100.

The point ledger storage unit 2105 stores the point ledger 2105A including the point history information and the point balance information of each excavator-related user registered in advance.

Figure 6:
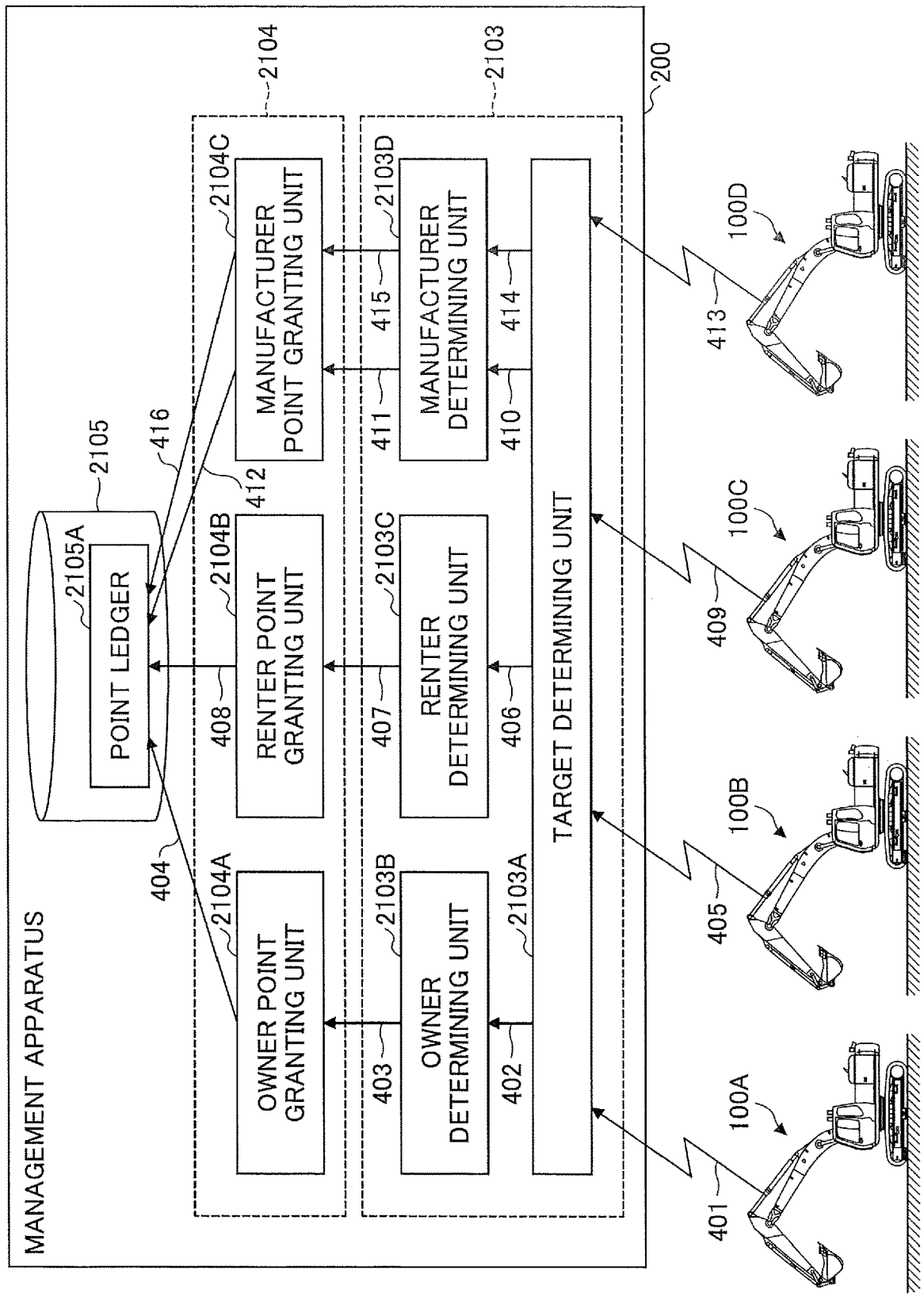
FIG. 6 is a functional block diagram illustrating the process from information collection to point granting in an information collection system.

For example, as illustrated in FIG. 6, operation log information (group) is uploaded from the excavator 100A (see arrow 401). Then, based on the excavator identification information of the excavator 100A included in the operation log information, the target determining unit 2103A determines that the point contributor is the owner and the operator is the point granting target. The target determining unit 2103A reports this determination result to the owner determining unit 2103B (see arrow 402).

The owner determining unit 2103B determines whether the operation log information (group) uploaded from the excavator 100A satisfies the owner evaluation condition in response to the report from the target determining unit 2103A. When it is determined that the operation log information satisfies the owner evaluation condition, the owner determining unit 2103B reports this determination result and the amount of points to be added, to the owner point granting unit 2104A (see arrow 403).

The owner point granting unit 2104A updates the point history information and the point balance information associated with the user identification information corresponding to the operator of the excavator 100A in the point ledger 2105A in response to the report from the owner determining unit 2103B (see arrow 404). Accordingly, points are granted to the operator of the excavator 100A.

For example, operation log information (groups) is uploaded from the excavator 100B (see arrow 405). Then, based on the excavator identification information of the excavator 100B included in the operation log information, the target determining unit 2103A determines that the point contributor is the rental provider of the excavator 100 and that the point granting target is the borrower of the excavator 100B. Then, the target determining unit 2103A reports this determination result to the renter determining unit 2103C (see arrow 406).

The renter determining unit 2103C determines whether the operation log information (group) uploaded from the excavator 100B satisfies the rental provider evaluation condition in response to the report from the target determining unit 2103A. When it is determined that the operation log information satisfies the renter evaluation condition the renter determining unit 21030 reports this determination result and the amount of points to be added to the renter point granting unit 2104B (see arrow 407).

The renter point granting unit 2104B updates the point history information and the point balance information associated with the user identification information corresponding to the borrower of the excavator 100B in the point ledger 2105A in response to the report from the renter determining unit 2103C (see arrow 408). Accordingly, points are granted to the borrower of the excavator 100B.

For example, operation log information (group) is uploaded from the excavator 100C (see arrow 409). Then, based on the excavator identification information of the excavator 100C included in the operation log information, the target determining unit 2103A determines that the point contributor is the manufacturer of the excavator 100 and that the point granting target is the owner of the excavator 100C. The target determining unit 2103A reports this determination result to the manufacturer determining unit 2103D (see arrow 410).

The manufacturer determining unit 2103D determines whether the operation log information (group) uploaded from the excavator 100C satisfies the manufacturer evaluation condition in response to the report from the target determining unit 2103A. When it is determined that the manufacturer evaluation condition is satisfied, the renter determining unit 2103C reports this determination result and the amount of points to be added to the manufacturer point granting unit 2104C (see arrow 411).

The manufacturer point granting unit 2104C updates the point history information and the point balance information associated with the user identification information corresponding to the owner of the excavator 100C in the point ledger 2105A in response to the report from the manufacturer determining unit 2103D (see arrow 412). Accordingly, points are granted to the owner of the excavator 100C.

For example, operation log information (group) is uploaded from the excavator 100D (see arrow 413). Then, based on the excavator identification information of the excavator 100D included in the operation log information, the target determining unit 2103A determines that the point contributor is the manufacturer of the excavator 100 and that the point granting target is the operator of the excavator 100D. The target determining unit 2103A reports this determination result to the manufacturer determining unit 2103D (see arrow 414).

The manufacturer determining unit 2103D determines whether the operation log information (group) uploaded from the excavator 100D satisfies the manufacturer evaluation condition in response to the report from the target determining unit 2103A. When it is determined that the manufacturer evaluation condition is satisfied, the renter determining unit 2103C reports this determination result and the amount of points to be added to the manufacturer point granting unit 2104C (see arrow 415).

The manufacturer point granting unit 2104C updates the point history information and the point balance information associated with the user identification information corresponding to the operator of the excavator 100D in the point ledger 2105A in response to the report from the manufacturer determining unit 2103D (see arrow 416). Accordingly, points are granted to the operator of the excavator 100D.

As described above, when a plurality of management apparatuses 200 is provided, when the point ledger 2105A is updated, one management apparatus 200 may transmit the updated point ledger 2105A or the updated contents thereof to the other management apparatuses 200A so that the updated contents are shared as a whole. In this case, the distributed ledger technology may be applied to the information collection system SYS with respect to the granting of points to excavator-related users.

Referring back to FIG. 5, the point information providing unit 2106 transmits point information relating to the excavator-related user specified by the point information request signal to the user terminal 300 in response to a predetermined request signal (hereinafter, the "point information request signal") received from the user terminal 300. Therefore, the point information providing unit 2106 can display the point information of the excavator-related user on the display device 340 of the user terminal 300.

<Configuration of User Terminal>

As illustrated in FIG. 5, the user terminal 300 includes a control device 310, the communication device 320, an operation input device 330, and a display device 340.

The control device 310 implements various kinds of control relating to the user terminal 300. The control device 310 includes a point information requesting unit 3101 and a point information display processing unit 3102 as functional units implemented by executing, for example, a predetermined application program (hereinafter, "point information providing application") installed in an auxiliary storage device, on the CPU.

For example, the communication device 320 is connected to a predetermined communication network such as a mobile communication network having a base station as a terminal or a satellite communication network using a communication satellite and the like, and communicates with an external device such as the management apparatus 200 and the like.

The operation input device 330 receives the operation input from the user of the user terminal 300 and outputs a signal corresponding to the operation input to the control device 310. The operation input device 330 may be, for example, a touch panel or a button switch and the like.

In place of or in addition to the operation input device 330, other input devices may be provided in the user terminal 300 for receiving input other than the operation input from the user and outputting a signal corresponding to the input to the control device 310. Other input devices may include, for example, a sound input device or a gesture input device for receiving sound input or gesture input from a user.

The display device 340 displays various information images to a user of the user terminal 300 under the control of the control device 310. The display device 340 may be, for example, a liquid crystal display or an organic EL display.

In place of or in addition to the display device 340, other output devices that output information to the user may be provided in the user terminal 300. Other output devices may include, for example, sound output devices.

The point information requesting unit 3101 transmits a point information requesting signal to the management apparatus 200 in accordance with a predetermined operation input of a user through the operation input device 330 on the application screen of the point information providing application displayed in the display device 340.

The point information display processing unit 3102 displays the point information received from the management apparatus 200 on the display device 340. Accordingly, the excavator-related user can confirm the point history information or the point balance information of the points granted to himself/herself.

[Modifications/Variations]

While the embodiments have been described in detail above, the present disclosure is not limited to such particular embodiments, and various modifications and variations are possible within the scope of the appended claims.

For example, in the above described embodiments, the functions of the determining unit 2103 and the point granting unit 2104 may be transferred to the excavator 100. Specifically, the evaluation condition of the plurality of excavators 100 configuring the information collection system SYS is determined and the point ledger is updated, and the updated point ledger (an example of information relating to an incentive) may be transmitted to the management apparatus 200 (an example of an external device) or the other excavator 100 so that the updated point ledger is shared as a whole. In this case, in the information collection system SYS, a distributed ledger technology may be applied with respect to the granting of points to the excavator-related user.

According to an aspect of the present invention, a technique that enables efficient collection of various kinds of information relating to the work machine, can be provided.

What is claimed is:

1. An information processing system comprising:
   a setting unit configured to receive, from a user related to a work machine including a work attachment, approval or disapproval of providing information relating to the work machine in operation and to set the received approval or disapproval;
   an information acquiring unit in a management apparatus, the information acquiring unit being configured to acquire only information whose provision is approved by the user from among the information relating to the work machine whose provision is approved or disapproved by the user, in accordance with the set approval or disapproval; and an incentive granting unit configured to perform a process of granting an incentive to the user, in response to determining that the information acquired by the information acquiring unit satisfies an evaluation condition that is predetermined, wherein the information acquired by the information acquiring unit includes posting information relating to the work machine, the posting information being manually input by the user, the posting information being information at a time of exchanging opinions with the management apparatus, and the incentive granting unit is configured to determine an amount of the incentive granted to the user based on quality and quantity of the posting information.

2. The information processing system according to claim 1, wherein the information acquired by the information acquiring unit further includes at least one of information relating to a state of the work machine, information relating to an operator, information relating to a surrounding environment of the work machine, or information relating to maintenance of the work machine.

3. The information processing system according to claim 2, wherein the information relating to the surrounding environment of the work machine includes at least one of information relating to weather, information relating to outside air temperature, or information relating to an object around the work machine including a terrain in a three-dimensional space around the work machine.

4. The information processing system according to claim 2, wherein the information relating to the operator includes at least one of information identifying the operator operating the work machine, biological information of the operator operating the work machine, information relating to a state of the operator operating the work machine, or information relating to an adjustment state of a device relating to the operator.

5. The information processing system according to claim 2, wherein the information relating to the state of the work machine includes at least one of information relating to an operation state of the work machine, information relating to a motion state of the work machine, information relating to an orientation state of the work machine, or information relating to a running state of a power source of the work machine.

6. The information processing system according to claim 1, wherein the evaluation condition includes that a minimum data set configured by a first type of information that is defined in advance is included in the information acquired by the information acquiring unit, the first type of information being among a plurality of types of information providable from the work machine.

7. The information processing system according to claim 6, wherein the incentive granting unit grants the incentive that is higher than a predetermined threshold to the user, in response to determining that a second kind of information that is defined in advance is included in the information acquired by the information acquiring unit in addition to the minimum data set, when the evaluation condition is satisfied.

8. The information processing system according to claim 6, wherein the minimum data set includes image information obtained by an imaging device configured to capture an image of a surrounding area the work machine.

9. The information processing system according to claim 6, wherein the minimum data set includes information for identifying a worksite where the work machine performs work.

10. The information processing system according to claim 6, wherein the minimum data set includes information relating to safety of the work machine.

11. The information processing system according to claim 6, wherein the minimum data set includes information relating to construction at a worksite where the work machine performs work.

12. The information processing system according to claim 1, wherein
the information acquiring unit acquires the posting information relating to the work machine from a user terminal used by the user, and
the incentive granting unit performs the process of granting the incentive to the user, in response to determining that the posting information satisfies the evaluation condition that is predetermined.

13. The information processing system according to claim 1, further comprising:
a determining unit configured to determine a contributor of the incentive and the user who is an incentive granting target based on identification information of the work machine included in the information acquired by the information acquiring unit, and determine whether the information acquired by the information acquiring unit satisfies the evaluation condition set by the contributor of the incentive,
wherein the incentive granting unit is configured to perform the process of granting the incentive to the user by updating ledger information storing correspondence between the user and the incentive granted to the user, in response to the determining unit determining that the information acquired by the information acquiring unit satisfies the evaluation condition.

14. An information processing method executed by an information processing system, the information processing method comprising:
receiving, from a user related to a work machine including a work attachment, approval or disapproval of providing information relating to the work machine in operation;
setting the received approval or disapproval;
acquiring, by a management apparatus, only information whose provision is approved by the user from among the information relating to the work machine whose provision is approved or disapproved by the user, in accordance with the set approval or disapproval; and
performing a process of granting an incentive to the user, in response to determining that the acquired information satisfies an evaluation condition that is predetermined,
wherein the acquired information includes posting information relating to the work machine, the posting information being manually input by the user, the posting information being information at a time of exchanging opinions with the management apparatus, and
an amount of the incentive granted to the user is determined based on quality and quantity of the posting information.

15. The information processing method according to claim 14, further comprising:

determining a contributor of the incentive and the user who is an incentive granting target based on identification information of the work machine included in the acquired information, and determining whether the acquired information satisfies the evaluation condition set by the contributor of the incentive, wherein the process of granting the incentive to the user is performed by updating ledger information storing correspondence between the user and the incentive granted to the user, in response to determining that the acquired information satisfies the evaluation condition.

16. A non-transitory computer-readable recording medium storing a program that causes a computer to execute a process performed by a management apparatus in an information processing system, wherein approval or disapproval of providing information relating to a work machine including a work attachment is received from a user related to the work machine and is set, the process comprising:

acquiring only information whose provision is approved by the user from among the information relating to the work machine whose provision is approved or disapproved by the user, in accordance with the set received approval or disapproval; and performing a process of granting an incentive to the user, in response to determining that the acquired information satisfies an evaluation condition that is predetermined, wherein the acquired information includes posting information relating to the work machine, the posting information being manually input by the user, the posting information being information at a time of exchanging opinions with the management apparatus, and an amount of the incentive granted to the user is determined based on quality and quantity of the posting information.

17. The non-transitory computer-readable recording medium according to claim 16, wherein the process further comprises determining a contributor of the incentive and the user who is an incentive granting target based on identification information of the work machine included in the acquired information, and determining whether the acquired information satisfies the evaluation condition set by the contributor of the incentive, and the process of granting the incentive to the user is performed by updating ledger information storing correspondence between the user and the incentive granted to the user, in response to determining that the acquired information satisfies the evaluation condition.

\* \* \* \* \*